United States Patent
Cellarius et al.

(10) Patent No.: US 12,035,173 B2
(45) Date of Patent: Jul. 9, 2024

(54) APPLICATION ADAPTATION WITH EXPOSURE OF NETWORK CAPACITY

(71) Applicant: Telefonaktiebolaget LM Ericsson (publ), Stockholm (SE)

(72) Inventors: Bastian Cellarius, Aachen (DE);
Wanlu Sun, San Diego, CA (US);
Stefano Sorrentino, Solna (SE);
Thorsten Lohmar, Aachen (DE);
Massimo Condoluci, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 17/435,134

(22) PCT Filed: Feb. 17, 2020

(86) PCT No.: PCT/EP2020/054111
§ 371 (c)(1),
(2) Date: Aug. 31, 2021

(87) PCT Pub. No.: WO2020/178013
PCT Pub. Date: Sep. 10, 2020

(65) Prior Publication Data
US 2022/0141711 A1    May 5, 2022

Related U.S. Application Data

(60) Provisional application No. 62/813,809, filed on Mar. 5, 2019.

(51) Int. Cl.
*H04W 4/00* (2018.01)
*H04W 28/02* (2009.01)
(Continued)

(52) U.S. Cl.
CPC ... *H04W 28/0942* (2020.05); *H04W 28/0268* (2013.01); *H04W 28/12* (2013.01); *H04W 28/24* (2013.01)

(58) Field of Classification Search
None
See application file for complete search history.

(56) References Cited

U.S. PATENT DOCUMENTS 6,230,200 B1 * 5/2001 Forecast ............... G06F 9/50
709/219
11,216,314 B2   1/2022 Harwood et al.
(Continued)

FOREIGN PATENT DOCUMENTS

JP   2018046544 A    3/2018
WO      9967969 A1  12/1999
(Continued)

OTHER PUBLICATIONS

"3GPP TR 23.786 V1.1.0", 3rd Generation Partnership Project; Technical Specification Group Services and System Aspects; Study on architecture enhancements for EPS and 5G System to support advanced V2X services (Release 16), Jan. 2019, pp. 1-111.
(Continued)

*Primary Examiner* — Zewdu A Beyen
(74) *Attorney, Agent, or Firm* — Murphy, Bilak & Homiller, PLLC

(57) ABSTRACT

According to an aspect, there is provided a method performed by a communication network for negotiating a data transfer between an application service and a user equipment, UE, via the communication network. The method comprises: receiving (620), from the application service or a backend controller associated with the application service, a request for network capacity available for data transfer, wherein the request includes an indication of an amount of data to be transferred and one or more trajectories of the UE;
(Continued)

determining (630) network capacity along the one or more trajectories based on load information associated with a radio access network, RAN, of the communication network; and sending (640), to the application service or the backend controller associated with the application service, a response including information related the determined network capacity.

36 Claims, 12 Drawing Sheets

(51) Int. Cl.
*H04W 28/08* (2023.01)
*H04W 28/12* (2009.01)
*H04W 28/24* (2009.01)

(56) References Cited

U.S. PATENT DOCUMENTS

| | | | |
|---|---|---|---|
| 2012/0226789 | A1 | 9/2012 | Ganesan et al. |
| 2013/0095880 | A1 | 4/2013 | Tzamaloukas |
| 2014/0287730 | A1 | 9/2014 | Masuda et al. |
| 2017/0006431 | A1 | 1/2017 | Donovan et al. |
| 2018/0124805 | A1 | 5/2018 | Tonshal et al. |
| 2018/0184430 | A1 | 6/2018 | Das |

FOREIGN PATENT DOCUMENTS

| | | |
|---|---|---|
| WO | 2013007287 A1 | 1/2013 |
| WO | 2014071974 A1 | 5/2014 |
| WO | 2017140356 A1 | 8/2017 |

OTHER PUBLICATIONS

"Solution proposal on the key issue#15", SA WG2 Meeting #129, S2-1810595, Dongguan, China (revision of S2-18xxxx), Oct. 15-19, 2018, pp. 1-4.

"3GPP TS 23.501 V15.4.0", 3rd Generation Partnership Project; Technical Specification Group Services and System Aspects; System Architecture for the 5G System; Stage 2 (Release 15), Dec. 2018, pp. 1-236.

"3GPP TS 23.503 V15.4.0", 3rd Generation Partnership Project; Technical Specification Group Services and System Aspects; Policy and Charging Control Framework for the 5G System; Stage 2 (Release 15), Dec. 2018, pp. 1-76.

"3GPP TS 24.301 V15.5.0", 3rd Generation Partnership Project; Technical Specification Group Core Network and Terminals; Non-Access-Stratum (NAS) protocol for Evolved Packet System (EPS); Stage 3 (Release 15), Dec. 2018, pp. 1-536.

"3GPP TS 33.401 V15.6.0", 3rd Generation Partnership Project; Technical Specification Group Services and System Aspects; 3GPP System Architecture Evolution (SAE); Security architecture (Release 15), Dec. 2018, pp. 1-163.

"3GPP TS 38.401 V15.4.0", 3rd Generation Partnership Project; Technical Specification Group Radio Access Network; NG-RAN; Architecture description (Release 15), Dec. 2018, pp. 1-40.

"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

"Solution proposal for key issue #13 communicating application requirements from the V2X application server", 3GPP TSG-SA WG6 Meeting #25, S6-181048, Sophia-Antipolis, France, (revision of S6-181xxx), Jul. 23-27, 2018, 1-2.

\* cited by examiner

APPLICATION ADAPTATION WITH EXPOSURE OF NETWORK CAPACITY

TECHNICAL FIELD

The present application relates generally to the field of communication networks and more specifically to techniques for scheduling future data transfers in wireless communication networks in scenarios where the data transfers are subject to time and/or location constraints.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a unified data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

In 3GPP, a study item on a new radio interface for a fifth-generation (5G) cellular (e.g., wireless) network has recently been completed. 3GPP is now standardizing this new radio interface, often abbreviated by NR (New Radio). FIG. 2 illustrates a high-level view of the 5G network architecture, consisting of a Next Generation RAN (NG-RAN) 299 and a 5G Core (5GC) 298. NG-RAN 299 can include a set of gNodeB's (gNBs) connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 250. With respect the NR interface to UEs, each of the gNBs can support frequency division duplexing (FDD), time division duplexing (TDD), or a combination thereof.

NG-RAN 299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/TP (3GPP TS 33.401) shall be applied.

The NG RAN logical nodes shown in FIG. 2 (and described in TS 38.401 and TR 38.801) include a central (or centralized) unit (CU or gNB-CU) and one or more distributed (or decentralized) units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 2. The gNB-CU and connected gNB-DUs are only visible to other gNBs and the 5GC as a gNB. In other words, the F1 interface is not visible beyond gNB-CU.

FIG. 3 shows a high-level view of an exemplary 5G network architecture, including a Next Generation Radio Access Network (NG-RAN) 399 and a 5G Core (5GC) 398. As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330a, b) via respective NG-C interfaces and to the UPF (User Plane Function) 340 (e.g., UPFs 340a,b) via respective NG-U interfaces.

Each of the gNBs 310 can support the NR radio interface, including frequency division duplexing (FDD), time division duplexing (TDD), or a combination thereof. In contrast, each of ng-eNBs 320 supports the LTE radio interface but, unlike conventional LTE eNBs (such as shown in FIG. 1), connect to the 5GC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 4 shows an exemplary non-roaming 5G reference architecture with service-based interfaces and various 3GPP-defined NFs within the Control Plane (CP). These include:

Access and Mobility Management Function (AMF) with Namf interface;
Session Management Function (SMF) with Nsmf interface;
User Plane Function (UPF) with Nupf interface;
Policy Control Function (PCF) with Npcf interface;
Network Exposure Function (NEF) with Nnef interface;
Network Repository Function (NRF) with Nnrf interface;
Network Slice Selection Function (NSSF) with Nnssf interface;
Authentication Server Function (AUSF) with Nausf interface;
Application Function (AF) with Naf interface;
Network Data Analytics Function (NWDAF) (not shown); and
Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

5G networks, including the 5G SBA, are intended to support Intelligent Transportation Systems (ITS) applications, including road transport. Communication of vehicles with each other (vehicle-to-vehicle, or V2V), with infrastructure (V2I), and with vulnerable road users are expected to increase user safety and comfort, and to improve traffic management and/or reduce congestion, and to reduce vehicle fuel consumption and emissions. Collectively, these communication modes are commonly referred to as vehicle to everything (V2X). An extensive set of ITS-related use cases for V2X have been developed, and, based on these use cases, V2X communication requirements have been developed.

The provisioning of services requires management of network resources, which are typically requested by a service while the service is running. Nevertheless, the provisioning of some services can be optimized by advance management and/or scheduling of network resources. One such service is "background data transfer" (described in 3GPP TS 23.503 clause 6.1.2.4), a service typically associated with transfer of very large (or "huge") data volume with low traffic priority (e.g., software updates) that is not time sensitive, e.g., having relaxed time constraints such that the data transmission can be postponed. Such background data transfer services that are scheduled in advance, as discussed above, are also referred to as "future data transfer."

The background data transfer service is of high interest for many Internet-of-Things (IoT) uses cases, where a massive number of sensors have to send their measurements thus generating a huge amount of data to be transmitted. Collected IoT data are often not time sensitive, and their transmissions may be delayed also for several hours or even days.

The background data transfer service is of high interest for several V2X scenarios, including applications in which vehicles collect large amounts of data (e.g., via on-board cameras or other sensors) and need to upload such data to vehicle-manufacturer cloud(s) without strict time constraints. In other V2X scenarios, vehicles can receive a huge amount of information (e.g., map tiles) from their OEM clouds or from map providers. Other scenarios that could involve two-way transfer of huge amounts of information include autonomous driving. In many of these scenarios, data transmission/reception can be delayed for a long time (e.g., several days), but other scenarios can require information delivery in tens of minutes or a few hours to avoid the information becoming irrelevant time-wise and/or geographically. For example, a vehicle should receive map tiles and other relevant information for a particular geographic area a sufficient amount of time before approaching that area.

3GPP TS 23.503 (v15.4.0) specifies some procedures designed for the transmission of huge amounts of data, with the goal of facilitating the creation of ad-hoc policies to reduce the priority of such transmissions (e.g., to facilitate "background data transfer") and to enforce ad-hoc charging policies. With respect to IoT scenarios, 3GPP introduced the procedure for "Negotiations for future background data transfer" in which an AF negotiates an ad-hoc transfer policy with the network, e.g., via PCF or NEF depending whether the AF is trusted.

Even so, these procedures are targeted at IoT-type scenarios/applications such as measurement reporting from massive sensor networks, where both the pattern for data transmission and the sensors generating the data are very static. These limitations do not hold for V2X scenarios, where the sensors are highly mobile and the data transmission pattern can vary greatly. As such, negotiated policies may become invalid, irrelevant, and/or stale over time. Although potentially re-negotiable, policies drive network behavior, so network operators generally prefer to keep changes to network policies at minimum. This can limit the flexibility of dynamic configuration of policies for future data transfer scenarios, and thus create various problems, issues, drawbacks, and/or difficulties with respect to more dynamic scenarios such as found in V2X use cases.

SUMMARY

Accordingly, exemplary embodiments of the present disclosure address these and other difficulties in scheduling resources across communication networks that include RAN, CN, and cloud components.

Exemplary embodiments of the present disclosure include methods and/or procedures for negotiating a data transfer between an application and a user equipment (UE) via a communication network. The exemplary methods and/or procedures can be performed by a network capacity analytics function (NCAF) that is part of, or associated with, the communication network (e.g., a network function in a core network). In some implementations, the exemplary methods and/or procedures of the NCAF presented herein can be part of the functions or operations of a network function (NF) or network node that is part of, or associated with, the communication network or a core network of the communication network. Therefore references herein to methods, procedures, steps and/or operations performed by the NCAF should be understood as including a NF or core network node performing those methods, procedures, steps and/or operations.

In some embodiments, the exemplary methods and/or procedures can include obtaining load information associated with a radio access network (RAN) of the communication network. The load information can be obtained on a periodic or on an as-needed basis from one or more nodes associated with the RAN.

The exemplary methods and/or procedures can also include receiving, from an application service, a request for network capacity available for data transfer to or from a UE. The request can include an indication of an amount of data to be transferred, as well as one or more trajectories of the UE. In some embodiments, the request can also include one or more of the following: one or more quality-of-service (QoS) profiles for the data transfer; a desired type of units and/or statistics for expressing network capacity; and a desired response configuration. In some embodiments, the request can be received from backend controller associated with the application service.

The exemplary methods and/or procedures can also include determining network capacity along the one or more trajectories based on the load information associated with the RAN. In some embodiments, when the request includes QoS profile(s), the network capacity can be determined along the one or more trajectories for each of the one or more QoS profiles.

In some embodiments, determining network capacity can include the following operations: receiving, from a coverage map database, network coverage information for the plurality of positions comprising each of the trajectories; for each of the trajectories, determining network resources needed to execute the data transfer based on the network coverage information; and for each of the trajectories, determining network capacity based on obtained load information related to the determined network resources.

The exemplary methods and/or procedures can also include sending, to the application service, a response including information related the determined network capacity. In some embodiments, the response can be sent to the backend controller. In some embodiments, the information related to the network capacity can include a vector of capacity values, with each capacity value corresponding to a particular time interval during which the particular capacity value is valid. In some embodiments, the information related to the network capacity can also include a level of confidence associated with each capacity value.

Other exemplary embodiments of the present disclosure include other methods and/or procedures for negotiating a data transfer between an application and a user equipment (UE) via a communication network. The exemplary methods and/or procedures can be performed by a backend controller associated with the application service. In some implementations, the 'backend controller associated with the application service' can be separate from the application service, and in other implementations the exemplary methods and/or procedures of the backend controller presented herein can be part of the functions or operations of the application service. Therefore references herein to methods, procedures, steps and/or operations performed by the backend controller should be understood as including an application service performing those methods, procedures, steps and/or operations or a separate node associated with the application service performing those methods, procedures, steps and/or operations.

In some embodiments, the exemplary methods and/or procedures can include receiving a planned route from a UE. The planned route can include a plurality of time-position tuples, each tuple comprising a particular time and a particular position at which the UE is expected to be located at the particular time.

The exemplary methods and/or procedures can also include sending, to the communication network, a request for network capacity available for data transfer to or from the UE. The request can include an indication of an amount of data to be transferred, as well as one or more trajectories of the UE. In some embodiments, the request can also include one or more of the following: one or more quality-of-service (QoS) profiles for the data transfer; a desired type of units and/or statistics for expressing network capacity; and a desired response configuration. In some embodiments, the request can be sent to a network capacity analytics function (NCAF) associated with the communication network.

The exemplary methods and/or procedures can also include receiving, from the communication network, a response including information related the network capacity along the one or more trajectories according to load information associated with the RAN. In some embodiments, the response can be received from the NCAF. In some embodiments, the information related to the network capacity can include a vector of capacity values, with each capacity value corresponding to a particular time interval during which the particular capacity value is valid. In some embodiments, the information related to the network capacity can also include a level of confidence associated with each capacity value. In some embodiments, where the request included one or more QoS profiles, the response can include information related to network capacity for each of one or more QoS profiles along each of the one or more trajectories.

The exemplary methods and/or procedures can also include determining a delivery plan for the data transfer based on the information related to network capacity. In various embodiments, determining a delivery plan can include one or more of the following operations: select a particular QoS profiles and a particular trajectory; selecting one or more time windows during which the data transfer will be executed, based on a vector of capacity values and the corresponding time intervals; and determining a speed for the UE during at least a portion of a selected time window.

The exemplary methods and/or procedures can also include configuring at least one of the UE and the content server to execute the data transfer according to the determined delivery plan. In some embodiments, the configuring operation can include sending a plurality of application commands, to the UE or the content server, for controlling execution of the data transfer along the trajectory of the UE.

Thus, exemplary embodiments of the present disclosure include methods and/or procedures for negotiating a data transfer between an application or an application service and a UE via a communication network. The exemplary methods and/or procedures can be performed by a communication network, for example by an NCAF that is part of, or associated with, the communication network (e.g., a network function in a core network), or by a NF or a network node that is part of, or associated with, the communication network or a core network of the communication network. The exemplary methods and/or procedures comprise receiving, from an application service or a backend controller associated with the application service, a request for network capacity available for data transfer, wherein the request includes an indication of an amount of data to be transferred and one or more trajectories of the UE; determining network capacity along the one or more trajectories based on load information associated with a RAN of the communication network; and sending, to the application service or the backend controller associated with the application service, a response including information related the determined network capacity.

Other exemplary embodiments of the present disclosure include other methods and/or procedures for negotiating a data transfer between an application or an application service and a UE via a communication network. The exemplary methods and/or procedures can be performed by a backend controller associated with the application service, and comprise: sending, to the communication network, a request for network capacity available for data transfer, wherein the request includes an indication of an amount of data to be transferred and one or more trajectories of the UE; receiving, from the communication network, a response including information related to network capacity along the one or more trajectories according to load information associated with a RAN of the communication network; determining a delivery plan for the data transfer based on the information related to network capacity; and configuring at least one of the UE and a content server to execute the data transfer according to the determined delivery plan.

Other exemplary embodiments include apparatus such backend controllers, NCAFs, and associated servers or network nodes that are configured to perform operations corresponding to the exemplary methods and/or procedures. Other exemplary embodiments include non-transitory, computer-readable media storing computer-executable instructions that, when executed by a processing circuit associated with such apparatus, configure the same to perform operations corresponding to the exemplary methods and/or procedures.

Thus, other exemplary embodiments of the present disclosure include a network node, for example an NCAF or other NF, configured to negotiate a data transfer between an application or an application service and a UE via a communication network, the network node comprising: a network interface controller configured to communicate with the application service and the communication network; and processing circuitry operably coupled to the network interface controller. The processing circuitry and the network interface controller are configured to: receive, from the application service or a backend controller associated with the application service, a request for network capacity available for data transfer, wherein the request includes an indication of an amount of data to be transferred and one or more trajectories of the UE; determine network capacity along the one or more trajectories based on load information associated with a RAN of the communication network; and send, to the application service or the backend controller associated with the application service, a response including information related the determined network capacity.

Other exemplary embodiments of the present disclosure include a network node, for example an NCAF or other NF, configured to negotiate a data transfer between an application or an application service and a UE via a communication network, configured to negotiate a data transfer between an application or an application service and a UE via a communication network, the network node being arranged or configured to: receive, from the application service or a backend controller associated with the application service, a request for network capacity available for data transfer, wherein the request includes an indication of an amount of data to be transferred and one or more trajectories of the UE; determine network capacity along the one or more trajectories based on load information associated with a RAN of the communication network; and send, to the application service or the backend controller associated with the application service, a response including information related the determined network capacity.

Other exemplary embodiments of the present disclosure include an apparatus for use in or with an application service (such as a backend controller that is part of or associated with the application service), configured to negotiate a data transfer between an application or application service and a UE via a communication network, the apparatus comprising: a network interface controller configured to communicate with the communication network (for example a network node (such as a NCAF or a NF) associated with the communication network; and processing circuitry operably coupled to the network interface controller. The processing circuitry and the network interface controller are configured to: send, to the communication network, a request for network capacity available for data transfer, wherein the request includes an indication of an amount of data to be transferred and one or more trajectories of the UE; receive, from the communication network, a response including information related to network capacity along the one or more trajectories according to load information associated with a RAN of the communication network; determine a delivery plan for the data transfer based on the information related to network capacity; and configure at least one of the UE and a content server to execute the data transfer according to the determined delivery plan.

Other exemplary embodiments of the present disclosure include an apparatus for use in or with an application service (such as a backend controller that is part of or associated with the application service), configured to negotiate a data transfer between an application or application service and a UE via a communication network, the apparatus being arranged or configured to: send, to the communication network, a request for network capacity available for data transfer, wherein the request includes an indication of an amount of data to be transferred and one or more trajectories of the UE; receive, from the communication network, a response including information related to network capacity along the one or more trajectories according to load information associated with a RAN of the communication network; determine a delivery plan for the data transfer based on the information related to network capacity; and configure at least one of the UE and a content server to execute the data transfer according to the determined delivery plan.

DETAILED DESCRIPTION

Figure 1:
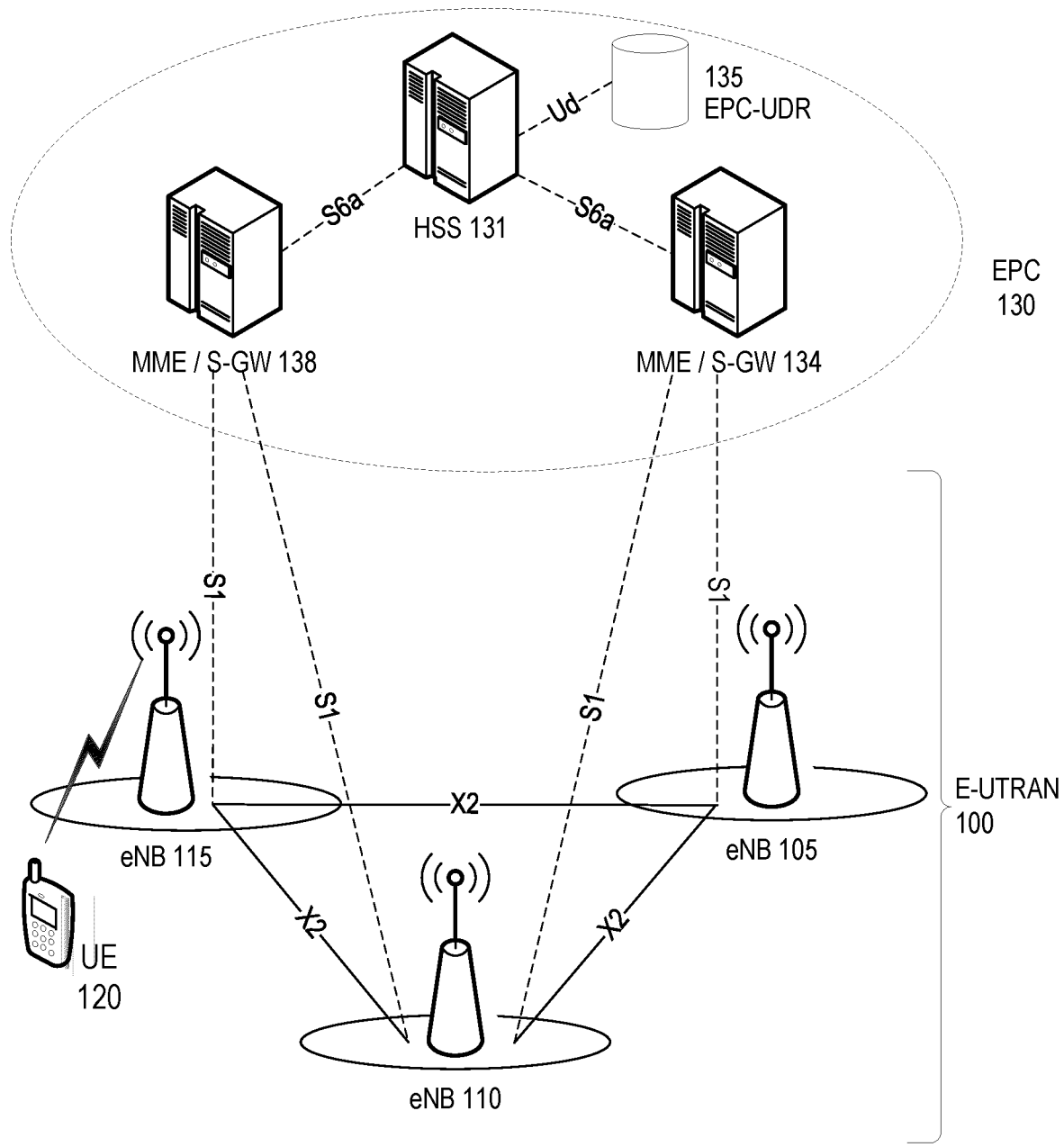
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
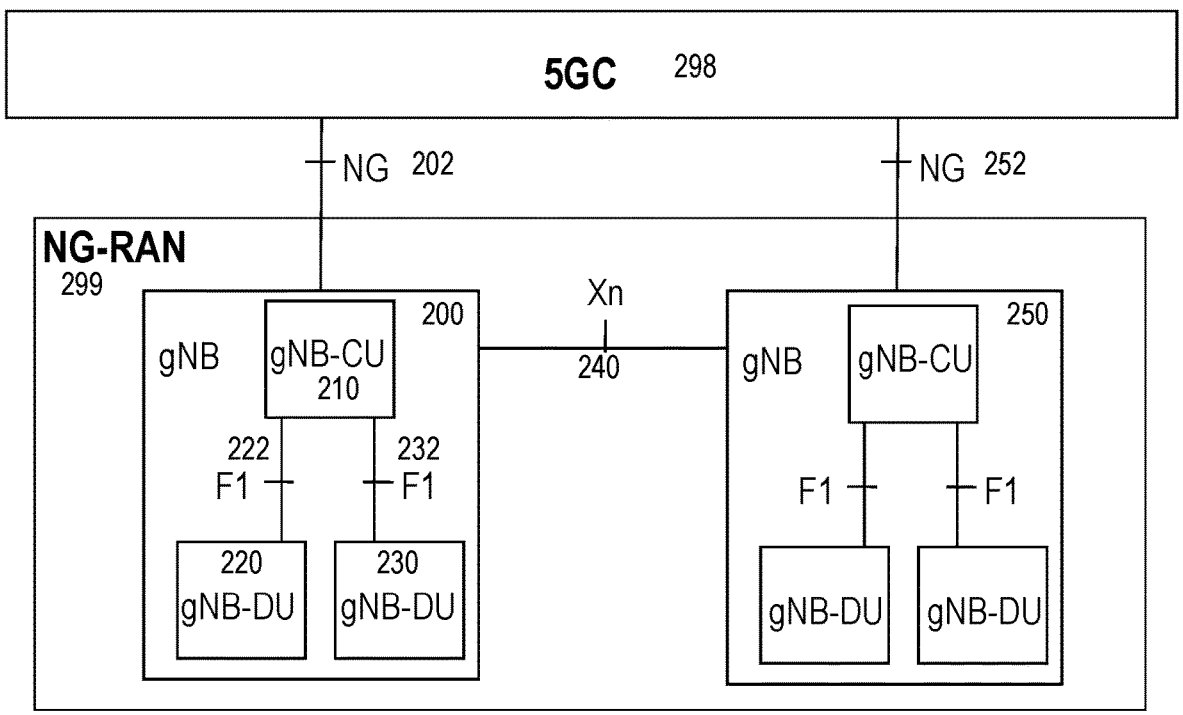
FIGS. 2-3 illustrate two different high-level views of a 5G network architecture.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

As briefly mentioned above, 3GPP TS 23.503 (v15.4.0) specifies some procedures designed for the transmission of huge amounts of data, with the goal of facilitating the creation of ad-hoc policies to reduce the priority of such transmissions (e.g., to facilitate "background data transfer") and to enforce ad-hoc charging policies. Even so, these procedures are targeted at IoT-type scenarios/applications such as measurement reporting from massive sensor networks, where both the pattern for data transmission and the sensors generating the data are very static. These limitations do not hold for V2X scenarios, where the sensors are highly mobile and the data transmission pattern can vary greatly.

As such, negotiated policies may become invalid, irrelevant, and/or stale over time. Although potentially re-negotiable, policies drive network behavior, so network operators generally prefer to keep changes to network policies at minimum. This can limit the flexibility of dynamic configuration of policies for future data transfer scenarios, and thus create various problems, issues, drawbacks, and/or difficulties with respect to more dynamic scenarios such as found in V2X use cases. These aspects are discussed in more detail below.

For example, negotiation for the background data transfer service targets a group of UEs, which are managed by the same owner and/or service provider and, optionally, are located within a specific geographical area. As a more specific example, a background data transfer service can be configured to provide all Toyota vehicles with software updates during a particular time window and, optionally, within a particular geographic area. However, use cases that require individualized (e.g., per-UE and/or per-application) configuration are not easily handled in this manner.

As a further example, the future background data transfer service allows the negotiations of time windows for the data transfer. Even so, negotiated windows are static once agreed between the network and the AF, and apply to all traffic of associated service(s) and/or UEs. In contrast, certain V2X applications require time windows that can be flexibly configured per-UE and/or per-content type. Furthermore, the negotiated policies for background data transfer do not allow and/or facilitate the selection and/or reconfiguration of service delivery strategies and/or parameters such as QoS Profile, UE/flow priority, etc. In general, all of the features mentioned above require a tighter integration of negotiated policies with network components (e.g., RAN nodes) than is currently provided.

As another example, although the future background data transfer procedure allows an AF to include geographical areas in a request, the expected and/or planned trajectory of UEs is not available to the network. Furthermore, as mentioned above, background data transfer targets groups of UEs, so the individual UE movement is not even considered. This can limit the optimization of data transmission and the selection of most appropriate time windows. Moreover, without such information, the network is unable to optimize the utilization of resources in the network nodes involved in the data transfer.

As yet another example, an AF is not provided with feedback about the network's capability in meeting a given deadline for a background data transfer. In general, the service is not aware whether the network is capable of delivering a certain file size within a certain deadline. Similarly, the network is not aware of the amount of data to be transferred by the service and its associated transmission deadline (unless statically configured).

Exemplary embodiments of the present disclosure address these and other problems, challenges, and/or issues by techniques that enable and/or facilitate an application service to improve and/or optimize the transmission of huge amounts of data of a single application. Such embodiments provide a more flexible and dynamic procedure compared to existing procedures that rely on static time windows and procedures for data transfer. Moreover, such embodiments enable and/or facilitate the application service to exploit information about expected and/or predicted network capacity for such improvements and/or optimizations. Furthermore, such embodiments do not require updates of network policies when the application service has other traffic to transfer during different time windows.

In various embodiments, given a need to deliver a particular amount of data to (from) one or more UEs from (to) a content server, an application service can request, from a communication network, the network capacity along the trajectory(ies) of the UE(s). The application service can provide planned and/or expected trajectories of the UE(s), e.g., as one or more lists of locations (e.g., way points), each location having an associated time stamp. The request can be sent by a backend controller associated with the application to a network capacity analytics function (NCAF) that is part of, or associated with, the communication network. For example, the NCAF can be part of the 5GC SBA. As noted above, the backend controller can be a node that is separate from the application service, or the backend controller can be part of the functions or operations of the application service, and, unless otherwise indicated or clear from the context, the terms "backend controller" and "application service" are used herein interchangeably. Likewise, as noted above the NCAF can be a separate node or network function (NF) in the communication network, or the methods and/or procedures of the NCAF described herein can be implemented by another NF or network node that is part of, or associated with, the communication network or a core network of the communication network. Therefore, unless otherwise indicated or clear from the context, references to operations and/or functions performed by an NCAF should be understood as including these operations and/or functions being performed by another NF or network node in or associated with a communication network.

In various embodiments, the network can respond with information about the network capacity that is expected and/or predicted to be supported at locations and time windows associated with the UE trajectory(ies). For example, the network can provide transfer capabilities expected and/or predicted to be supported at the respective locations and time windows. This can include respective amounts of data (e.g., bytes) the network is expected to be able to deliver, and/or respective average data rate(s) that are expected (also referred to as average available link bitrates).

Based on this capacity information provided by the network, the application service (e.g., the backend controller) create a delivery plan for the particular amount of data needing to be delivered along the UE trajectory(ies). Furthermore, the backend controller can change the operational state of the delivery (e.g., start/stop/pause/resume) according to the delivery plan. For example, the backend controller can pause the delivery during a time period when the indicated network capacity is limited, and resume during a subsequent time period when the indicated network capacity is not as limited. More specifically, the backend controller can direct (or "steer") a content server to shape the data flow with the UE, such as by interrupting or postponing an ongoing data transfer. Furthermore, if available link bitrates are provided, the backend controller can estimate the progress of the data transmission.

Advantages of these exemplary embodiments include improved prediction and load balancing capabilities because all service data flows handled by the same entity. More broadly, this can increase the overall efficiency of the network operation. Furthermore, such embodiments can enable and/or facilitate network operators to offer enhanced services (e.g., "file delivery within a deadline") to customers (e.g., vehicle manufacturers), based on knowledge that traffic associated with these enhanced services will not unreasonably impact other traffic in the network.

In the present disclosure, the term "network" is used generally to refer to a communication infrastructure between two nodes, e.g., cellular networks and sidelink (ad-hoc) communication.

In the present disclosure, the term "service" is used generally to refer to a set of data, associated with one or more applications, that is to be transferred via a network with certain specific delivery requirements that need to be fulfilled in order to make the applications successful. An example of a service could be a huge amount of data (e.g., a software update or upload of data) that may or may not be segmented into smaller chunks for efficient delivery. Other specific examples include high-definition (HD) map distribution, information reception/transmission for autonomous driving, crowd-sourcing of captured video and/or images for "point clouds."

Figure 3:
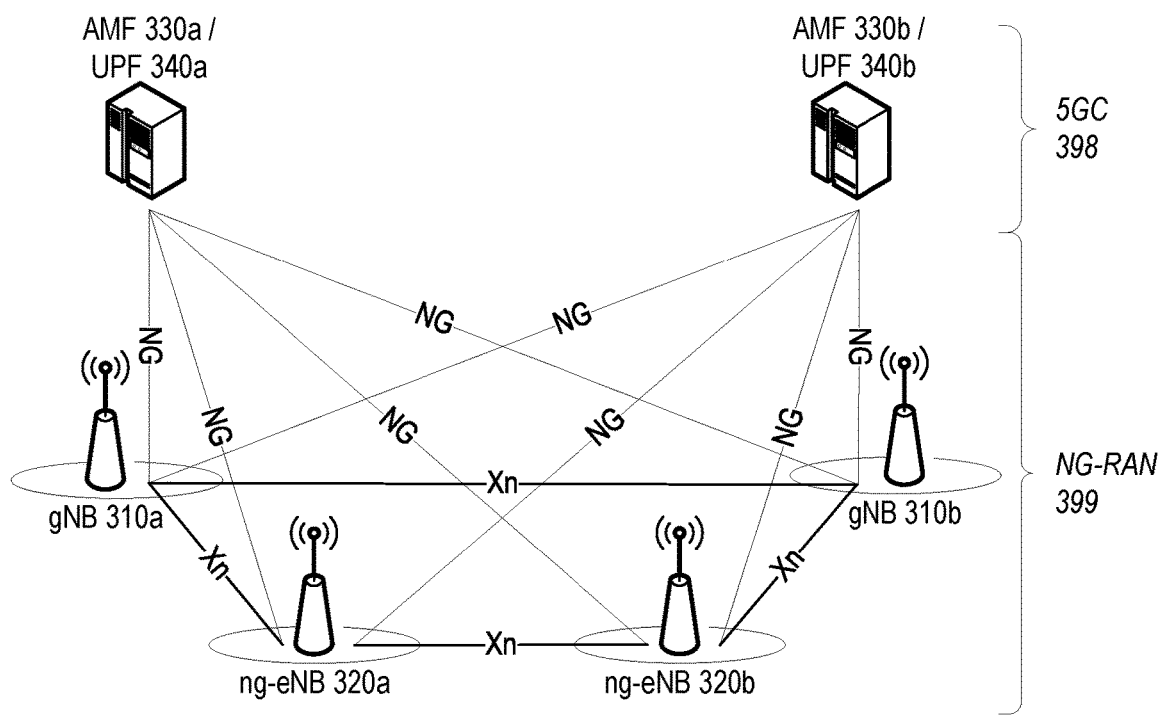
Figure 4:
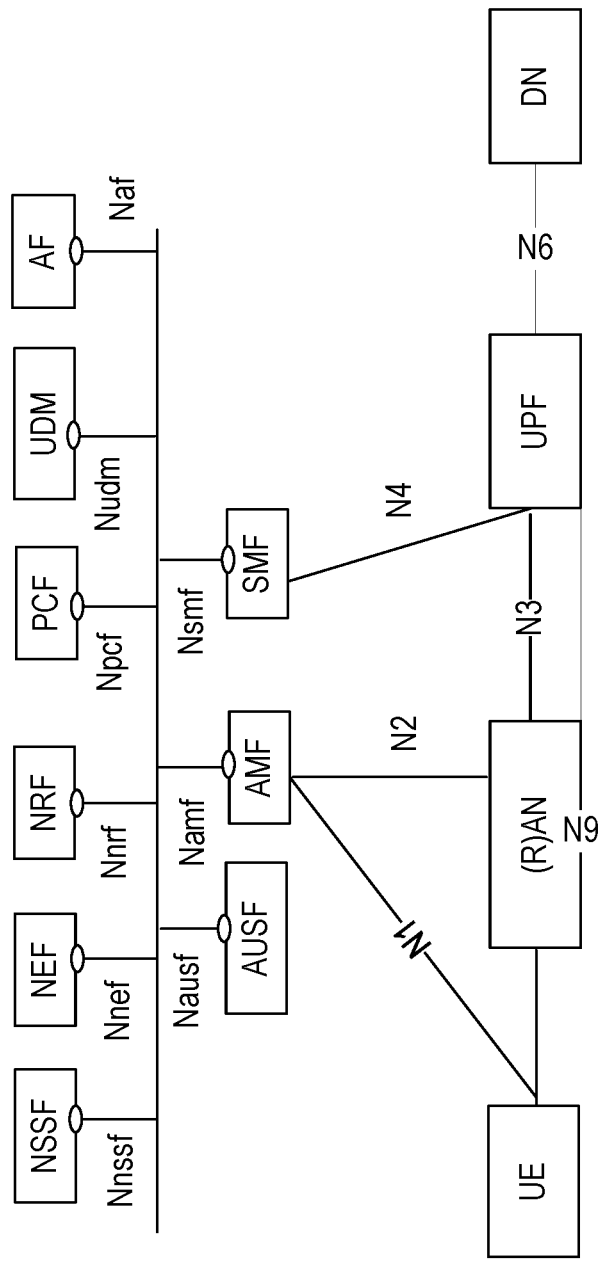
FIG. 4 shows an exemplary non-roaming 5G reference architectures with service-based interfaces and various network functions (NFs), as further described in 3GPP TS 23.501.
Figure 5:
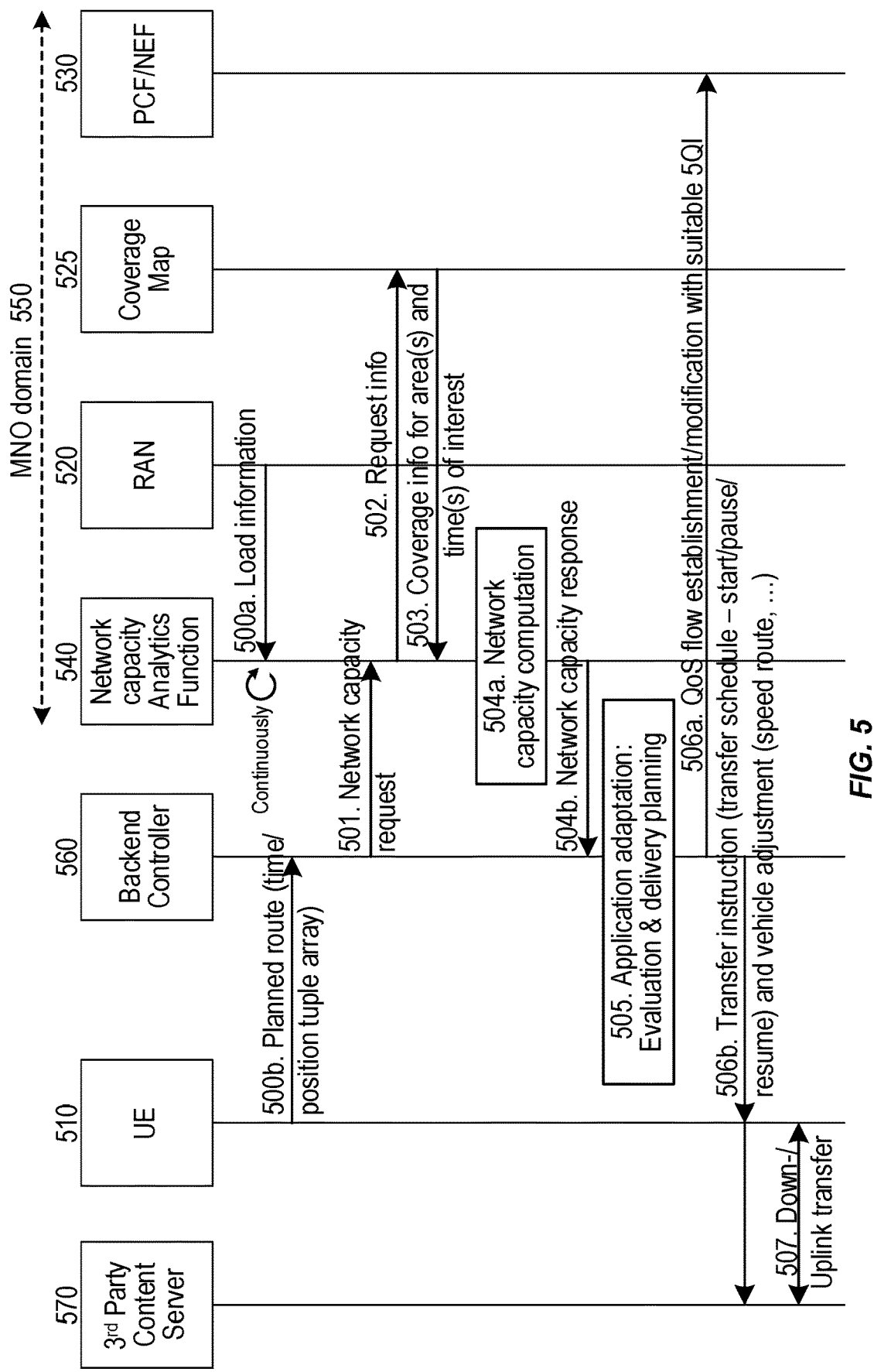
FIG. 5 illustrates various exemplary embodiments of the present disclosure, including the involved network nodes, functions, and/or entities, as well as the signalling flow among the involved entities.

FIG. 5 illustrates various exemplary embodiments of the present disclosure, including the involved network nodes, functions, and/or entities, as well as the signalling flow among the involved entities. More specifically, FIG. 5 shows a UE 510 that communicates with a (third-party) content server 570 associated with a particular application (e.g., a map application), a particular service provider (e.g., a vehicle manufacturer), etc. UE 510 communicates with content server 570 via a communication network, which can include a radio access network (RAN) 520 (e.g., an NG-RAN) and a core network (e.g., a 5GC). The core network can include various network functions, as described above, including PCF and NEF, which are collectively shown as PCF/NEF 530 in FIG. 3.

RAN 520 and the core network (including PCF/NEF 530) are part of a mobile network operator (MNO) domain 550. In addition, MNO domain 550 includes a coverage map 525 (e.g., stored in a database) and the network capacity analytics function (NCAF) 540, which was briefly mentioned above. In general, NCAF 540 can handle the computation of the network capacity taking into consideration information from RAN 520 and coverage map 525, along with other internal or external sources as necessary and/or beneficial. For example, NCAF 540 can compute network capacity based on historical analytics and/or statistical data, coupled with machine-learning algorithms.

NCAF 540 is configured to communicate with a backend controller 560, which is external to MNO domain 550. The backend controller is associated with an application service which desires to deliver content from (to) content server 570 to (from) UE 510. In general terms, backend controller 560 is responsible for interacting with the network (e.g., MNO domain 550) on behalf of the application service. In addition, the backend controller is responsible for managing the data transfer between content server 570 and one or more UEs, including UE 510. This can include starting, stopping, pausing, increasing the rate of, and decreasing the rate of the data transfer. As such, backend controller 560 is configured to communicate with content server 570.

In various embodiments, backend controller 560 can be implemented as an application function (AF). Similarly, NCAF 540 (or the operations and/or functions of the NCAF 540) can be implemented in a PCF, NEF, NWDAF, AMF, or in another network function (NF) that backend controller 560 (e.g., an AF) is authorized to access directly or indirectly (e.g., through information exposure via NEF). NCAF 540 can also be part of the management system of the network. More generally, NCAF 540 can be operably coupled to various network nodes and functions, including PCF, UFP, AMF, and an operations and maintenance (OAM) system.

Although FIG. 5 illustrates exemplary embodiments in relation to a 5G system, this is merely for illustration and other embodiments can be used together with a 4G system, such as shown in FIG. 1. For example, in embodiments where MNO domain 550 includes an LTE EPC rather than a 5GC, backend controller 560 can be a Service Capabilities Server/Application Server (SCS/AS) interacting with a policy and charging rules function (PCRF) or a service capability exposure function (SCEF). Furthermore, as briefly mentioned above, various embodiments are applicable both to delivery of data from a content server to one or more UEs, and delivery in the opposite direction from UE to an external point.

FIG. 5 also shows an exemplary signalling flow among the involved network nodes, functions, and/or entities according to various exemplary embodiments of the present disclosure. This exemplary signalling flow can relate to a procedure for negotiating the transfer of data between UE 510 content server 570, via resources in MNO domain 550, while UE 510 is moving along a trajectory. Although certain operations of the signalling flow are given numerical labels, such labels are for the purpose of illustration and do not limit the operations to occur in a numerical order, unless expressly stated otherwise. The operations comprising the signalling flow are described below.

Operation 500 includes various preparatory operations, including operations 500a and 500b as shown. In operation 500a, NCAF 540 collects load information from RAN 520 (e.g., from nodes, functions, and/or entities associated with RAN 520). This collection can be done on a continuous basis (e.g., with a predetermined and/or configured periodicity), on an event-driven basis (e.g., upon a trigger condition from within or outside of MNO domain 550), or a combination thereof. The load information can be actual current load (e.g., current resource usage), statistical load information (e.g., mean and variance of past resource usage), or a combination thereof. The load information can include number of served UEs, number of used radio bearers (RBs), quality-of-service (QoS) profiles (e.g., 5QIs) of served UEs, etc. Although not shown, NCAF 540 can also collect various load information from nodes, functions, and/or entities associated with the core network (e.g., 5GC or EPC). This can include UE priority, service-level agreement (SLA) information, etc.

In operation 500b, UE 510 sends backend controller 560 information about a planned route of travel for the UE. The planned route information can include an array of time-position "tuples," with each tuple comprising a particular time (e.g., a "time-stamp") and a particular position at which the UE is expected to be located at the particular time. This array of tuples can also be referred to as a "trajectory" of the UE.

In operation 501, backend controller 560 sends a request to NCAF 540 for network capacity available for data transfer between UE 510 and content server 570. Backend controller 560 can include with the request planned and/or expected trajectory(ies) of the UE(s), such as the array of time-position tuples received from UE 510 in operation 500b. In addition, backend controller 560 can include with the request an amount of data to be transferred.

In some embodiments, backend controller 560 can also include with the request a list of quality-of-service (QoS) profiles (e.g., 5QIs) that are of interest for the data transfer. In some embodiments, backend controller 560 can also include with the request a desired type of units and/or statistics for expressing network capacity. Exemplary units can include amount of bytes (per time window) that are expected to be transferred, an expected bit rate, etc. Exemplary statistics include average/variance, minimum/maximum, etc. This is discussed in more detail below.

In some embodiments, backend controller 560 can also include with the request a desired response configuration. For example, the backend controller 560 can indicate whether the network should provide only a one-time response, a periodic response according to a periodicity and a maximum number, or an update of a previously delivered response according to a trigger condition (e.g., when the update value of network capacity is higher than a threshold, which optionally can also be provided). In this manner, the backend controller 560 can collect a variety of network capacity information via one or more requests.

After receiving the capacity request in operation 501 including the UE trajectory, NCAF 540 can request (operation 502) and receive (operation 503) network coverage information associated with the UE trajectory(ies) from coverage map 525. Based on this coverage information and the load information collected during operation 500a, NCAF 540 computes the network capacity along the UE trajectory (ies) in operation 504A. In other words, if multiple trajectories were indicated in operation 501, NCAF 540 can compute capacity information along each of the trajectories.

In making this computation, NCAF 540 can also take into account other information provided with the request, such as QoS profile(s) of interest. For example, if backend controller 560 indicates several 5QIs in the request, NCAF 540 can compute a network capacity for each of the indicated 5QIs. Charging information (e.g., related to QoS profile) can also be associated with each of the computed network capacities.

In some embodiments, NCAF 540 can also compute a level of confidence (e.g., 90%) associated with each of the computed network capacities.

In operation 504B, NCAF 540 send a response to backend controller 560 that includes the computed capacities, along with any other relevant information determined in operation 504A (e.g., charging information associated with QoS profiles). If the request in operation 501 included a desired response configuration, the response can be sent in accordance with this configuration. For example, NCAF 540 can send a one-time response, a periodic response according to an indicated periodicity and maximum number of responses, or an update of a previously delivered response based on a specified trigger condition.

In various embodiments, the network capacity can be provided as a vector of values, where each value corresponds to a time interval during which the indicated capacity is valid. In some embodiments, the time intervals can be consecutive, such that the vector represents at least the duration of the UE trajectory(ies) received in the request. For example, each value can correspond to a specific 10-minute time interval. Alternatively, the time window can be expressed in an "over time" representation, e.g., over the duration of the trajectory(ies).

Likewise, if the request in operation 501 included a desired type of units and/or statistics, the response can be sent in accordance with this desired type. For example, NCAF 540 can indicate amount of bytes (per time window) that are expected to be transferred, an expected bit rate, etc. These can be indicated using average/variance, minimum/maximum, etc. according to the request. For example, if the network capacity is indicated by a single value (e.g., minimum/average/maximum), such a value can be accompanied by an associated level of confidence or confidence interval. As another example, the network capacity can be indicated by a range for each value (e.g., range for minimum, range for maximum, etc.). In this manner, NCAF 540 can indicate if the accuracy decreases for values associated with time intervals that are further in the future.

In operation 505, based on the received network capacity information, backend controller 560 can perform application adaptation and delivery planning for the data transfer. This can include various operations depending on the particular embodiment. Moreover, such operations can be performed upon reception of any network capacity information, including updates of previously-received capacity information.

As an example, if NCAF 540 provided network capacities associated with several QoS profiles (e.g., 5QIs) in the response, NCAF 540 can select one of the 5QIs based on the network capacities and other available information. More specifically, the backend controller can be aware of any "time deadlines" or "spatial deadlines" for data transfer and use such information to select the most suitable 5QI for data transmission and to determine a delivery plan for the data transfer, including specific time windows during which the data transfer will take place.

As used herein, a "time deadline" can refer to a future time interval during which, or a future time before which, a data transfer shall be executed and/or completed (e.g., a map update shall be executed before the deadline). As used herein, a "spatial deadline" can refer to a terminal geographic location (e.g., an end of a vehicle/UE trajectory) before which a data transfer shall be executed and/or completed. Even so, a spatial deadline is also time-related, such that it depends on the vehicle and/or UE speed and the route or trajectory used to reach the terminal geographic location.

Returning to the example, if a time deadline is very strict, backend controller 560 can select the 5QI associated with the largest network capacity to increase the probability of executing the data transfer before the time deadline. Furthermore, backend controller 560 can select a time window (e.g., a contiguous time window) for the data transfer during which the network capacity is indicated as remaining relatively high (e.g., above a threshold) for the entire time window. Alternately, backend controller 560 can select a non-contiguous time window consisting of multiple intervals during which the data transfer is alternated between being executed and being paused/stopped.

For example, data transfer can be temporarily stopped before the UE enters an area where the network capacity is expected to be low, and can be resumed when the UE enters an area where the network capacity is expected to be higher. The backend controller can determine such areas based on the known UE trajectory, which comprises time-location tuples as described above.

In some embodiments, backend controller 560 can also determine in operation 505 whether UE behaviour (e.g., vehicle speed) adjustment is needed based on the received network capacity information. For example, backend controller 560 can determine that vehicle speed should be reduced prior to entering a diminished capacity area so that the vehicle has more time for data transfer in the preceding area that has sufficient network capacity.

In various embodiments, the determination on operation 505 can be made iteratively based on ongoing monitoring of the data transfer by the backend controller. As an example, backend controller 560 can determine that a change of route is needed to place the vehicle on a trajectory having better capacity than the current trajectory, at least in the areas that the vehicle will soon enter. As another example, backend controller 560 can determine that the data transfer cannot be completed according to a time deadline with the currently selected 5QI, and also determine to change to a different 5QI that has a better capacity than the current 5QI over the vehicle trajectory, at least in the areas that the vehicle will soon enter.

Based on the determinations made in operation 505, in operation 506A, backend controller 560 can establish a QoS flow and/or session with the network (e.g., via PCF/NEF 530) according to the selected QoS profile (e.g., 5QI), or modify an established QoS flow/session accordingly. For example, operation 506A can be performed using existing network procedures (e.g., PDU Session or QoS Flow Establishment) that allow an application/service to trigger a data transfer according to a specific desired QoS treatment (5QI) of data traffic. As another example, operation 506A can be performed for an ongoing data transfer by modifying the parameters of the already-established session using existing network procedures (e.g., PDU Session or QoS Flow Establishment) in response to updated network capacity information.

In operation 506B, backend controller 560 can configure various entities to execute the data transfer according to the determined delivery plan. This can include UE(s) (e.g., UE 510) and/or content server 570. For example, backend controller 560 can send one or more application commands (e.g., start, stop, pause, resume, increase rate, decrease rate, etc.) to affect the data transfer according to the time windows determined as part of the delivery plan. As another example, backend controller 560 can adapt the data transfer according to the delivery plan by using built-in or ad-hoc features of transport protocols (e.g., congestion windows, etc.) after initiating the data transfer. As another example, backend controller 560 can send information about the time windows when data transfer should be active, such that the UE 510 and content server 570 can thereafter control the data transfer according to the indicated time windows.

In cases where the determination on operation 505 is made iteratively based on ongoing monitoring of the data transfer by backend controller 560, operation 506B can also be used to provide UE 510 and/or content server 570 any updates to the delivery plan, associated UE configuration changes (e.g., to 5QI), and/or UE trajectory changes.

In certain embodiments, operation 501 shown in FIG. 5 can be optional, such that network capacity computation (operation 504) and application adaptation (operation 505) can be performed by a triggering event other than a network capacity request from backend controller 560. For example, NCAF 540 can determine (e.g., based on ongoing monitoring) that the computed current network capacity deviates from the a previously-computed network capacity information, provided to backend controller 560, by more than a predetermined threshold. In response, NCAF 540 can send the updated network capacity information to backend controller 560.

In certain embodiments, operation 506 shown in FIG. 5 can be optional. For example, backend controller 540 can decide not to change the data transfer instruction, even if it receives an updated network capacity information from NCAF 560.

Figure 6:
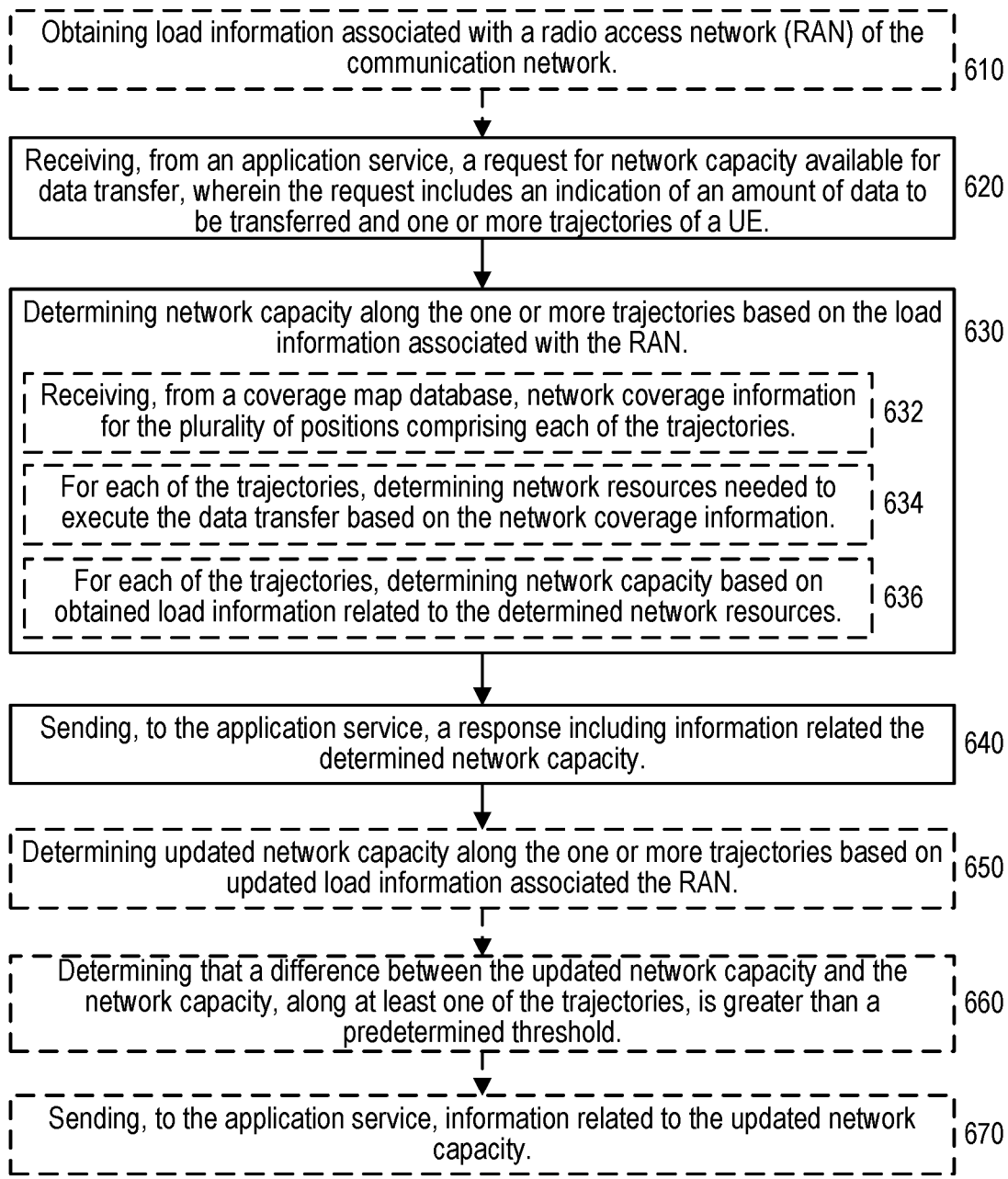
FIGS. 6-7 illustrate exemplary methods and/or procedures for negotiating a data transfer between an application and a user equipment (UE) via a communication network, according to various exemplary embodiments of the present disclosure.

FIG. 6 illustrates an exemplary method and/or procedure for negotiating a data transfer between an application and a user equipment (UE) via a communication network, according to various exemplary embodiments of the present disclosure. The exemplary method and/or procedure shown in FIG. 6 can be performed by a network capacity analytics function (NCAF) that is part of, or associated with, the communication network (e.g., a NF in a core network), or by another NF or network node, such as described herein with reference to other figures. Although the exemplary method and/or procedure is illustrated in FIG. 6 by blocks in a particular order, this order is exemplary and the operations corresponding to the blocks can be performed in different orders, and can be combined and/or divided into blocks and/or operations having different functionality than shown in FIG. 6. Furthermore, the exemplary method and/or procedure shown in FIG. 6 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

In some embodiments, the exemplary method and/or procedure can include the operations of block 610, in which the NCAF can obtain load information associated with a radio access network (RAN) of the communication network. For example, the NCAF can obtain the load information from one or more nodes associated with the RAN. The load information can be in various forms, as described above. Moreover, the NCAF can obtain the load information on a periodic or on an as-needed basis from the one or more nodes associated with the RAN.

The exemplary method and/or procedure can also include the operations of block 620, in which the NCAF can receive, from an application service, a request for network capacity available for data transfer to or from the UE. The request can include an indication of an amount of data to be transferred, as well as one or more trajectories of the UE. In some embodiments, the request can be received from backend controller associated with the application service. In some embodiments, each trajectory can include a plurality of time-position tuples, each tuple comprising a particular time and a particular position at which the UE is expected to be located at the particular time. In some embodiments, the trajectory can include a tuple comprising a time deadline of the data transfer and a spatial deadline of the data transfer.

In some embodiments, the request can include one or more of the following: one or more quality-of-service (QoS) profiles for the data transfer; a desired type of units and/or statistics for expressing network capacity; and a desired response configuration. In some embodiments, the desired response configuration can include one-time response, periodic response according to a periodicity and a maximum number of responses, or update of a previously delivered response according to a trigger condition.

The exemplary method and/or procedure can also include the operations of block 630, in which the NCAF can determine network capacity along the one or more trajectories based on the load information associated with the RAN. In some embodiments, when the request includes QoS profile, the network capacity can be determined along the one or more trajectories for each of the one or more QoS profiles.

In some embodiments, the operations of block 630 can include the operations of sub-blocks 632-636. In sub-block 632, the NCAF can receive, from a coverage map database, network coverage information for the plurality of positions comprising each of the trajectories. In sub-block 634, the NCAF can, for each of the trajectories, determine network resources needed to execute the data transfer based on the network coverage information. In sub-block 636, the NCAF can, for each of the trajectories, determine network capacity based on obtained load information related to the determined network resources.

The exemplary method and/or procedure can also include the operations of block 640, in which the NCAF can send, to the application service, a response including information related the determined network capacity. In some embodiments, the response can be sent to a backend controller associated with the application service. In some embodiments, the information related to the network capacity can include a vector of capacity values, with each capacity value corresponding to a particular time interval during which the particular capacity value is valid. In some embodiments, the information related to the network capacity can also include a level of confidence associated with each capacity value.

In some embodiments, the exemplary method and/or procedure can also include the operations of block 650, in which the NCAF can determine updated network capacity along the one or more trajectories based on updated load information associated the RAN. In such embodiments, the exemplary method and/or procedure can also include the operations of block 660, in which the NCAF can determine that a difference between the updated network capacity and the network capacity, along at least one of the trajectories, is greater than a predetermined threshold. In such embodiments, the exemplary method and/or procedure can also include the operations of block 670, in which the NCAF can send, to the application service in response to this difference determination, information related to the updated network capacity.

Figure 7:
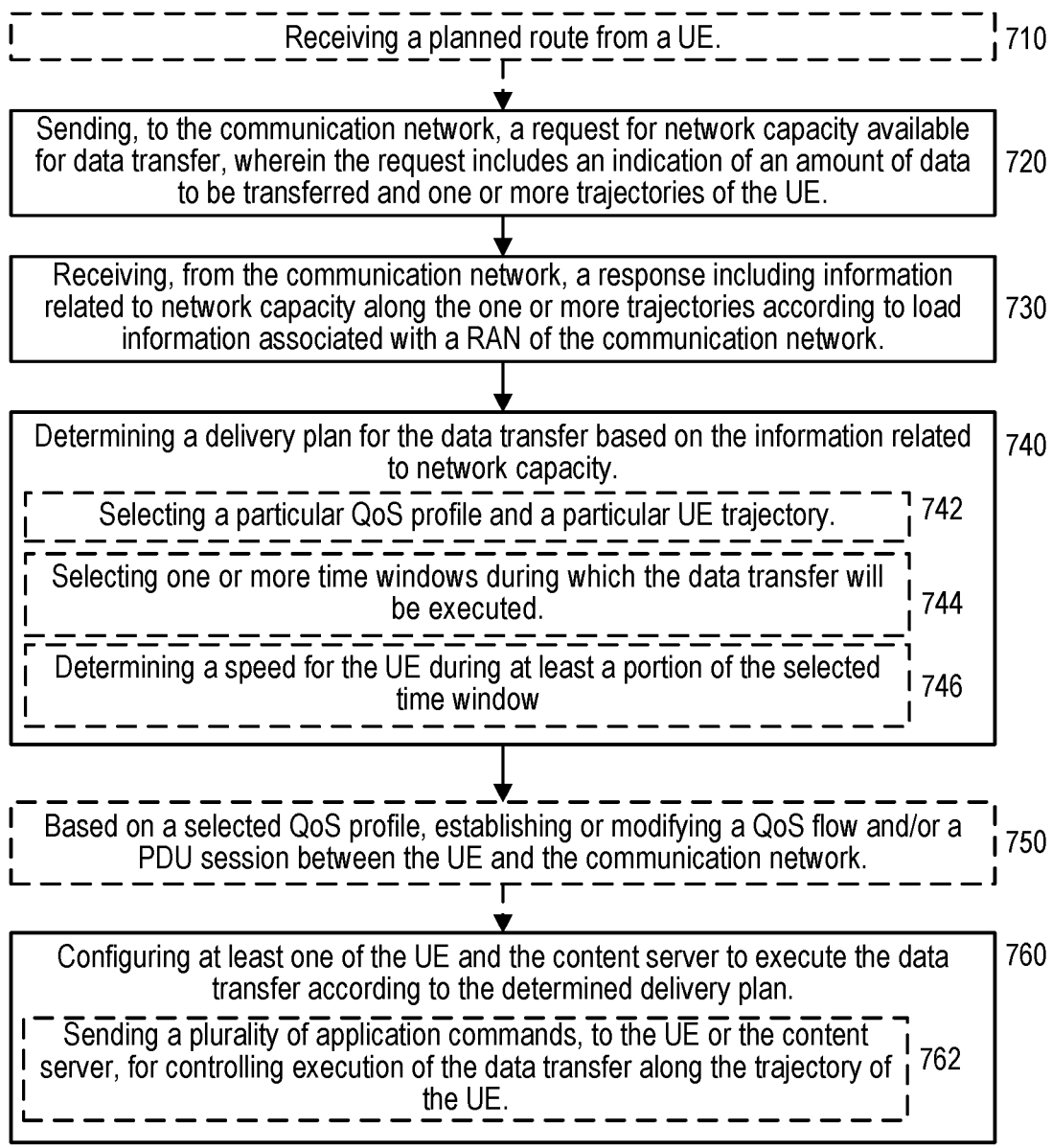

FIG. 7 illustrates an exemplary method and/or procedure for negotiating a data transfer between an application and a user equipment (UE) via a communication network, according to various exemplary embodiments of the present disclosure. The exemplary method and/or procedure shown in FIG. 7 can be performed by a backend controller associated with the application service, or by the application service itself, such as described herein with reference to other figures. Although the exemplary method and/or procedure is illustrated in FIG. 7 by blocks in a particular order, this order is exemplary and the operations corresponding to the blocks can be performed in different orders, and can be combined and/or divided into blocks having different functionality than shown in FIG. 7. Furthermore, the exemplary method and/or procedure shown in FIG. 7 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

In some embodiments, the exemplary method and/or procedure can include the operations of block 710, in which the backend controller can receive a planned route from the UE. The planned route can include a plurality of time-position tuples, each tuple comprising a particular time and a particular position at which the UE is expected to be located at the particular time.

The exemplary method and/or procedure can also include the operations of block 720, in which the backend controller can send, to the communication network, a request for network capacity available for data transfer to or from the UE. The request can include an indication of an amount of data to be transferred, as well as one or more trajectories of the UE. In some embodiments, the request can be sent to a network capacity analytics function (NCAF) associated with the communication network. In some embodiments, each trajectory can include a plurality of time-position tuples, each tuple comprising a particular time and a particular position at which the UE is expected to be located at the particular time. In some embodiments, each trajectory can include a tuple comprising a time deadline of the data transfer and a spatial deadline of the data transfer. In some embodiments, each trajectory can be based on the planned route (e.g., received in block 710).

In some embodiments, the request can also include one or more of the following: one or more quality-of-service (QoS) profiles for the data transfer; a desired type of units and/or statistics for expressing network capacity; and a desired response configuration. In some embodiments, the desired response configuration can include one-time response, periodic response according to a periodicity and a maximum number of responses, or update of a previously delivered response according to a trigger condition.

The exemplary method and/or procedure can include the operations of block 730, where the backend controller can receive, from the communication network, a response including information related the network capacity along the one or more trajectories according to load information associated with the RAN. In some embodiments, the response can be received from the NCAF. In some embodiments, the information related to the network capacity can include a vector of capacity values, with each capacity value corresponding to a particular time interval during which the particular capacity value is valid. In some embodiments, the information related to the network capacity can also include a level of confidence associated with each capacity value. In some embodiments, where the request included one or more QoS profiles, the response can include information related to network capacity for each of one or more QoS profiles along each of the one or more trajectories.

The exemplary method and/or procedure can also include the operations of block 740, in which the backend controller can determine a delivery plan for the data transfer based on the information related to network capacity (e.g., received in block 730). In embodiments where the request included one or more QoS profiles, the operations of block 740 can include the operations of sub-block 742, where the backend controller can select a particular one of the QoS profiles and a particular one of the trajectories. In some embodiments, selecting the particular QoS profile can be based on a time deadline and/or a spatial deadline, as these terms are defined herein. In embodiments where the response included information related to network capacity for each of one or more QoS profiles along each of the one or more trajectories, the selected QoS profile can be the particular QoS profile having the largest network capacity along the selected trajectory.

In some embodiments, the operations of block 740 can include the operations of sub-block 744, where the backend controller can select one or more time windows during which the data transfer will be executed, based on a vector of capacity values and the corresponding time intervals (e.g., received in block 730). In some embodiments, the vector of capacity values and the corresponding time intervals can be associated with a selected QoS profile and/or a selected trajectory. In some embodiments, the selected time window can include a contiguous plurality of the time intervals during which the corresponding capacity values are greater than a threshold. In other embodiments, the selected time window can include a non-contiguous plurality of the time intervals. In such embodiments, the delivery plan can also indicate that the data transfer will be paused or stopped during the intervening time intervals between the non-contiguous plurality.

In some embodiments, the operations of block 740 can include the operations of sub-block 746, where the backend controller can determine a speed for the UE during at least a portion of the selected time window.

In some embodiments, the exemplary method and/or procedure can also include the operations of block 750, in which the backend controller can establish or modify at least one of the following based on a selected QoS profile: a QoS flow between the UE and the communication network; and a protocol data unit (PDU) session between the UE and the communication network. For example, the QoS profile can be selected in sub-block 742.

The exemplary method and/or procedure can also include the operations of block 760, in which the backend controller can configure at least one of the UE and the content server to execute the data transfer according to the determined delivery plan. In some embodiments, the operations of block 760 include the operations of sub-block 762, where the backend controller can send a plurality of application commands, to the UE or the content server, for controlling execution of the data transfer along the trajectory of the UE. In some embodiments, the plurality of commands can include starting or resuming the data transfer during time windows included in the delivery plan, and stopping or pausing the data transfer during time windows not included in the delivery plan.

Figure 8:
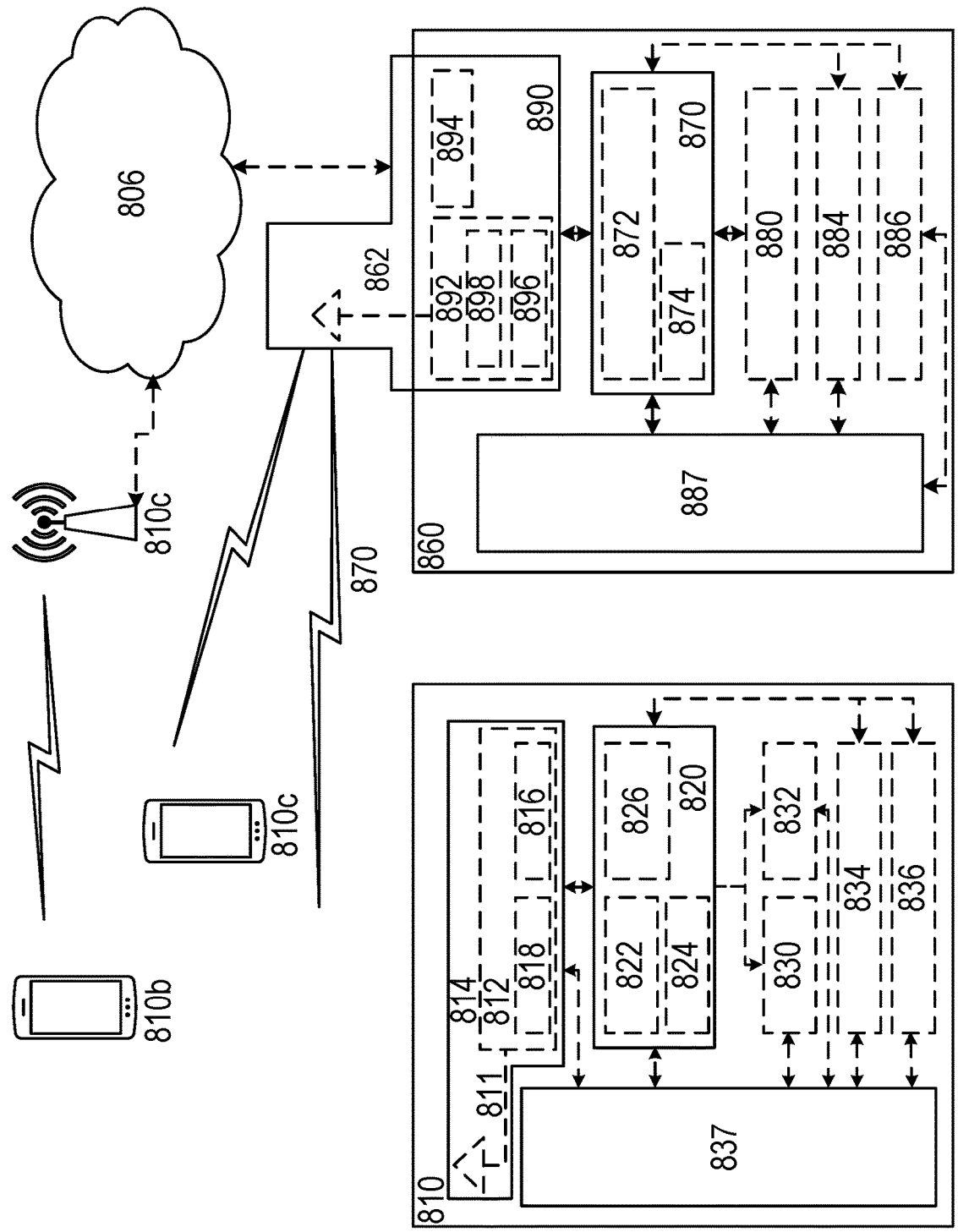
FIG. 8 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network can further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In some embodiments or implementations, the NCAF described above, or the functions and/or operations of the NCAF described above, can be part of a core network in network 806.

Network node 860 and WD 810 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 860 are depicted as single boxes located within a larger box, or nested within multiple boxes, in practice, a network node can comprise multiple different physical components that make up a single illustrated component (e.g., device readable medium 880 can comprise multiple separate hard drives as well as multiple RAM modules).

Similarly, network node 860 can be composed of multiple physically separate components (e.g., a NodeB component and a RNC component, or a BTS component and a BSC component, etc.), which can each have their own respective components. In certain scenarios in which network node 860 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 860 can be configured to support multiple radio access technologies (RATs). In such embodiments, some components can be duplicated (e.g., separate device readable medium 880 for the different RATs) and some components can be reused (e.g., the same antenna 862 can be shared by the RATs). Network node 860 can also include multiple sets of the various illustrated components for different wireless technologies integrated into network node 860, such as, for example, GSM, WCDMA, LTE, NR, WiFi, or Bluetooth wireless technologies. These wireless technologies can be integrated into the same or different chip or set of chips and other components within network node 860.

Processing circuitry 870 can be configured to perform any determining, calculating, or similar operations (e.g., certain obtaining operations) described herein as being provided by a network node. These operations performed by processing circuitry 870 can include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 can execute instructions stored in device readable medium 880 or in memory within processing circuitry 870. Such functionality can include providing any of the various wireless features, functions, or benefits discussed herein. In some embodiments, processing circuitry 870 can include a system on a chip (SOC).

In some embodiments, processing circuitry 870 can include one or more of radio frequency (RF) transceiver circuitry 872 and baseband processing circuitry 874. In some embodiments, radio frequency (RF) transceiver circuitry 872 and baseband processing circuitry 874 can be on separate chips (or sets of chips), boards, or units, such as radio units and digital units. In alternative embodiments, part or all of RF transceiver circuitry 872 and baseband processing circuitry 874 can be on the same chip or set of chips, boards, or units In certain embodiments, some or all of the functionality described herein as being provided by a network node, base station, eNB or other such network device can be performed by processing circuitry 870 executing instructions stored on device readable medium 880 or memory within processing circuitry 870. In alternative embodiments, some or all of the functionality can be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 870. Device readable medium 880 can store any suitable instructions, data or information, including a computer program, software, an application including one or more of logic, rules, code, tables, etc. and/or other instructions capable of being executed by processing circuitry 870 and, utilized by network node 860. Device readable medium 880 can be used to store any calculations made by processing circuitry 870 and/or any data received via interface 890. In some embodiments, processing circuitry 870 and device readable medium 880 can be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that can be coupled to, or in certain embodiments a part of, antenna 862. Radio front end circuitry 892 comprises filters 898 and amplifiers 896. Radio front end circuitry 892 can be connected to antenna 862 and processing circuitry 870. Radio front end circuitry can be configured to condition signals communicated between antenna 862 and processing circuitry 870. Radio front end circuitry 892 can receive digital data that is to be sent out to other network nodes or WDs via a wireless connection. Radio front end circuitry 892 can convert the digital data into a radio signal having the appropriate channel and bandwidth parameters using a combination of filters 898 and/or amplifiers 896. The radio signal can then be transmitted via antenna 862. Similarly, when receiving data, antenna 862 can collect radio signals which are then converted into digital data by radio front end circuitry 892. The digital data can be passed to processing circuitry 870. In other embodiments, the interface can comprise different components and/or different combinations of components.

In certain alternative embodiments, network node 860 may not include separate radio front end circuitry 892, instead, processing circuitry 870 can comprise radio front end circuitry and can be connected to antenna 862 without separate radio front end circuitry 892. Similarly, in some embodiments, all or some of RF transceiver circuitry 872 can be considered a part of interface 890. In still other embodiments, interface 890 can include one or more ports or terminals 894, radio front end circuitry 892, and RF transceiver circuitry 872, as part of a radio unit (not shown), and interface 890 can communicate with baseband processing circuitry 874, which is part of a digital unit (not shown).

Antenna 862 can include one or more antennas, or antenna arrays, configured to send and/or receive wireless signals. Antenna 862 can be coupled to radio front end circuitry 890 and can be any type of antenna capable of transmitting and receiving data and/or signals wirelessly. In some embodiments, antenna 862 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 862 can be separate from network node 860 and can be connectable to network node 860 through an interface or port.

Antenna 862, interface 890, and/or processing circuitry 870 can be configured to perform any receiving operations and/or certain obtaining operations described herein as being performed by a network node. Any information, data and/or signals can be received from a wireless device, another network node and/or any other network equipment. Similarly, antenna 862, interface 890, and/or processing circuitry 870 can be configured to perform any transmitting operations described herein as being performed by a network node. Any information, data and/or signals can be transmitted to a wireless device, another network node and/or any other network equipment.

Power circuitry 887 can comprise, or be coupled to, power management circuitry and can be configured to supply the components of network node 860 with power for performing the functionality described herein. Power circuitry 887 can receive power from power source 886. Power source 886 and/or power circuitry 887 can be configured to provide power to the various components of network node 860 in a form suitable for the respective components (e.g., at a voltage and current level needed for each respective component). Power source 886 can either be included in, or external to, power circuitry 887 and/or network node 860. For example, network node 860 can be connectable to an external power source (e.g., an electricity outlet) via an input circuitry or interface such as an electrical cable, whereby the external power source supplies power to power circuitry 887. As a further example, power source 886 can comprise a source of power in the form of a battery or battery pack which is connected to, or integrated in, power circuitry 887. The battery can provide backup power should the external power source fail. Other types of power sources, such as photovoltaic devices, can also be used.

Alternative embodiments of network node 860 can include additional components beyond those shown in FIG. 8 that can be responsible for providing certain aspects of the network node's functionality, including any of the functionality described herein and/or any functionality necessary to support the subject matter described herein. For example, network node 860 can include user interface equipment to allow and/or facilitate input of information into network node 860 and to allow and/or facilitate output of information from network node 860. This can allow and/or facilitate a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 can include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies can be integrated into the same or different chips or set of chips as other components within WD 810.

Antenna 811 can include one or more antennas or antenna arrays, configured to send and/or receive wireless signals, and is connected to interface 814. In certain alternative embodiments, antenna 811 can be separate from WD 810 and be connectable to WD 810 through an interface or port. Antenna 811, interface 814, and/or processing circuitry 820 can be configured to perform any receiving or transmitting operations described herein as being performed by a WD. Any information, data and/or signals can be received from a network node and/or another WD. In some embodiments, radio front end circuitry and/or antenna 811 can be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and can be configured to condition signals communicated between antenna 811 and processing circuitry 820. Radio front end circuitry 812 can be coupled to or a part of antenna 811. In some embodiments, WD 810 may not include separate radio front end circuitry 812; rather, processing circuitry 820 can comprise radio front end circuitry and can be connected to antenna 811. Similarly, in some embodiments, some or all of RF transceiver circuitry 822 can be considered a part of interface 814. Radio front end circuitry 812 can receive digital data that is to be sent out to other network nodes or WDs via a wireless connection. Radio front end circuitry 812 can convert the digital data into a radio signal having the appropriate channel and bandwidth parameters using a combination of filters 818 and/or amplifiers 816. The radio signal can then be transmitted via antenna 811. Similarly, when receiving data, antenna 811 can collect radio signals which are then converted into digital data by radio front end circuitry 812. The digital data can be passed to processing circuitry 820. In other embodiments, the interface can comprise different components and/or different combinations of components.

Processing circuitry 820 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality can include providing any of the various wireless features or benefits discussed herein. For example, processing circuitry 820 can execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry can comprise different components and/or different combinations of components. In certain embodiments processing circuitry 820 of WD 810 can comprise a SOC. In some embodiments, RF transceiver circuitry 822, baseband processing circuitry 824, and application processing circuitry 826 can be on separate chips or sets of chips. In alternative embodiments, part or all of baseband processing circuitry 824 and application processing circuitry 826 can be combined into one chip or set of chips, and RF transceiver circuitry 822 can be on a separate chip or set of chips. In still alternative embodiments, part or all of RF transceiver circuitry 822 and baseband processing circuitry 824 can be on the same chip or set of chips, and application processing circuitry 826 can be on a separate chip or set of chips. In yet other alternative embodiments, part or all of RF transceiver circuitry 822, baseband processing circuitry 824, and application processing circuitry 826 can be combined in the same chip or set of chips. In some embodiments, RF transceiver circuitry 822 can be a part of interface 814. RF transceiver circuitry 822 can condition RF signals for processing circuitry 820.

In certain embodiments, some or all of the functionality described herein as being performed by a WD can be provided by processing circuitry 820 executing instructions stored on device readable medium 830, which in certain embodiments can be a computer-readable storage medium. In alternative embodiments, some or all of the functionality can be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 can be configured to perform any determining, calculating, or similar operations (e.g., certain obtaining operations) described herein as being performed by a WD. These operations, as performed by processing circuitry 820, can include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 can be operable to store a computer program, software, an application including one or more of logic, rules, code, tables, etc. and/or other instructions capable of being executed by processing circuitry 820. Device readable medium 830 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 820. In some embodiments, processing circuitry 820 and device readable medium 830 can be considered to be integrated.

User interface equipment 832 can include components that allow and/or facilitate a human user to interact with WD 810. Such interaction can be of many forms, such as visual, audial, tactile, etc. User interface equipment 832 can be operable to produce output to the user and to allow and/or facilitate the user to provide input to WD 810. The type of interaction can vary depending on the type of user interface equipment 832 installed in WD 810. For example, if WD 810 is a smart phone, the interaction can be via a touch screen; if WD 810 is a smart meter, the interaction can be through a screen that provides usage (e.g., the number of gallons used) or a speaker that provides an audible alert (e.g., if smoke is detected). User interface equipment 832 can include input interfaces, devices and circuits, and output interfaces, devices and circuits. User interface equipment 832 can be configured to allow and/or facilitate input of information into WD 810, and is connected to processing circuitry 820 to allow and/or facilitate processing circuitry 820 to process the input information. User interface equipment 832 can include, for example, a microphone, a proximity or other sensor, keys/buttons, a touch display, one or more cameras, a USB port, or other input circuitry. User interface equipment 832 is also configured to allow and/or facilitate output of information from WD 810, and to allow and/or facilitate processing circuitry 820 to output information from WD 810. User interface equipment 832 can include, for example, a speaker, a display, vibrating circuitry, a USB port, a headphone interface, or other output circuitry. Using one or more input and output interfaces, devices, and circuits, of user interface equipment 832, WD 810 can communicate with end users and/or the wireless network, and allow and/or facilitate them to benefit from the functionality described herein.

Auxiliary equipment 834 is operable to provide more specific functionality which may not be generally performed by WDs. This can comprise specialized sensors for doing measurements for various purposes, interfaces for additional types of communication such as wired communications etc. The inclusion and type of components of auxiliary equipment 834 can vary depending on the embodiment and/or scenario.

Power source 836 can, in some embodiments, be in the form of a battery or battery pack. Other types of power sources, such as an external power source (e.g., an electricity outlet), photovoltaic devices or power cells, can also be used. WD 810 can further comprise power circuitry 837 for delivering power from power source 836 to the various parts of WD 810 which need power from power source 836 to carry out any functionality described or indicated herein.

Power circuitry 837 can in certain embodiments comprise power management circuitry. Power circuitry 837 can additionally or alternatively be operable to receive power from an external power source; in which case WD 810 can be connectable to the external power source (such as an electricity outlet) via input circuitry or an interface such as an electrical power cable. Power circuitry 837 can also in certain embodiments be operable to deliver power from an external power source to power source 836. This can be, for example, for the charging of power source 836. Power circuitry 837 can perform any converting or other modification to the power from power source 836 to make it suitable for supply to the respective components of WD 810.

Figure 9:
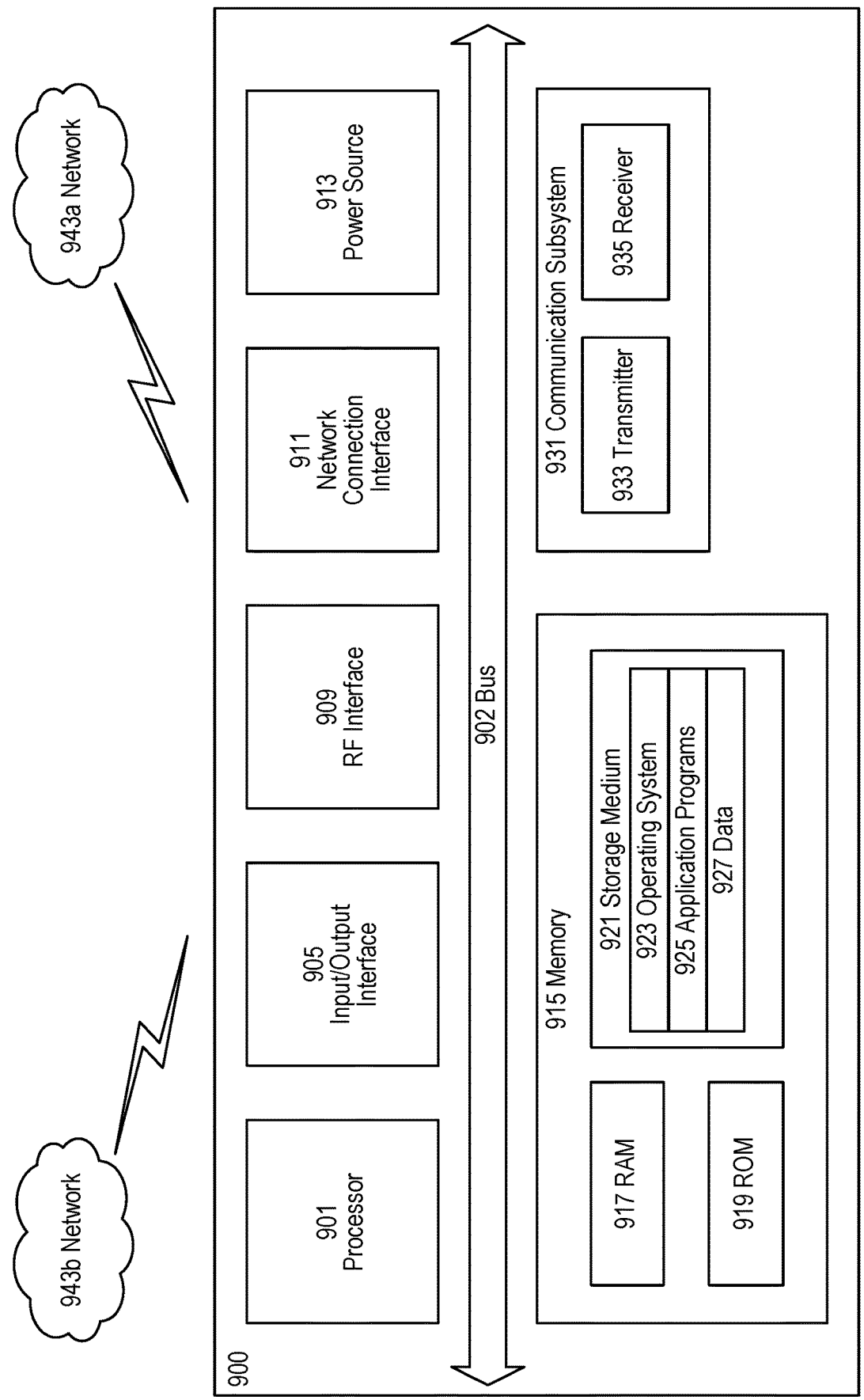
FIG. 9 illustrates an exemplary embodiment of a UE, in accordance with various aspects described herein.

FIG. 9 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 900 can be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 can include other similar types of information. Certain UEs can utilize all of the components shown in FIG. 9, or only a subset of the components. The level of integration between the components can vary from one UE to another UE. Further, certain UEs can contain multiple instances of a component, such as multiple processors, memories, transceivers, transmitters, receivers, etc.

In FIG. 9, processing circuitry 901 can be configured to process computer instructions and data. Processing circuitry 901 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 can include two central processing units (CPUs). Data can be information in a form suitable for use by a computer.

In the depicted embodiment, input/output interface 905 can be configured to provide a communication interface to an input device, output device, or input and output device. UE 900 can be configured to use an output device via input/output interface 905. An output device can use the same type of interface port as an input device. For example, a USB port can be used to provide input to and output from UE 900. The output device can be a speaker, a sound card, a video card, a display, a monitor, a printer, an actuator, an emitter, a smartcard, another output device, or any combination thereof. UE 900 can be configured to use an input device via input/output interface 905 to allow and/or facilitate a user to capture information into UE 900. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 9, RF interface 909 can be configured to provide a communication interface to RF components such as a transmitter, a receiver, and an antenna. Network connection interface 911 can be configured to provide a communication interface to network 943a. Network 943a can encompass wired and/or wireless networks such as a local-area network (LAN), a wide-area network (WAN), a computer network, a wireless network, a telecommunications network, another like network or any combination thereof. For example, network 943a can comprise a Wi-Fi network. Network connection interface 911 can be configured to include a receiver and a transmitter interface used to communicate with one or more other devices over a communication network according to one or more communication protocols, such as Ethernet, TCP/IP, SONET, ATM, or the like. Network connection interface 911 can implement receiver and transmitter functionality appropriate to the communication network links (e.g., optical, electrical, and the like). The transmitter and receiver functions can share circuit components, software or firmware, or alternatively can be implemented separately.

RAM 917 can be configured to interface via bus 902 to processing circuitry 901 to provide storage or caching of data or computer instructions during the execution of software programs such as the operating system, application programs, and device drivers. ROM 919 can be configured to provide computer instructions or data to processing circuitry 901. For example, ROM 919 can be configured to store invariant low-level system code or data for basic system functions such as basic input and output (I/O), startup, or reception of keystrokes from a keyboard that are stored in a non-volatile memory. Storage medium 921 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 can be configured to include operating system 923, application program 925 such as a web browser application, a widget or gadget engine or another application, and data file 927. Storage medium 921 can store, for use by UE 900, any of a variety of various operating systems or combinations of operating systems.

Storage medium 921 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMIM SDRAM, smartcard memory such as a subscriber identity module or a removable user identity (SIM/RUIM) module, other memory, or any combination thereof. Storage medium 921 can allow and/or facilitate UE 900 to access computer-executable instructions, application programs or the like, stored on transitory or non-transitory memory media, to off-load data, or to upload data. An article of manufacture, such as one utilizing a communication system can be tangibly embodied in storage medium 921, which can comprise a device readable medium.

In FIG. 9, processing circuitry 901 can be configured to communicate with network 943*b* using communication subsystem 931. Network 943*a* and network 943*b* can be the same network or networks or different network or networks. Communication subsystem 931 can be configured to include one or more transceivers used to communicate with network 943*b*. For example, communication subsystem 931 can be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver can include transmitter 933 and/or receiver 935 to implement transmitter or receiver functionality, respectively, appropriate to the RAN links (e.g., frequency allocations and the like). Further, transmitter 933 and receiver 935 of each transceiver can share circuit components, software or firmware, or alternatively can be implemented separately.

In the illustrated embodiment, the communication functions of communication subsystem 931 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 can include cellular communication, Wi-Fi communication, Bluetooth communication, and GPS communication. Network 943*b* can encompass wired and/or wireless networks such as a local-area network (LAN), a wide-area network (WAN), a computer network, a wireless network, a telecommunications network, another like network or any combination thereof. For example, network 943*b* can be a cellular network, a Wi-Fi network, and/or a near-field network. Power source 913 can be configured to provide alternating current (AC) or direct current (DC) power to components of UE 900.

The features, benefits and/or functions described herein can be implemented in one of the components of UE 900 or partitioned across multiple components of UE 900. Further, the features, benefits, and/or functions described herein can be implemented in any combination of hardware, software or firmware. In one example, communication subsystem 931 can be configured to include any of the components described herein. Further, processing circuitry 901 can be configured to communicate with any of such components over bus 902. In another example, any of such components can be represented by program instructions stored in memory that when executed by processing circuitry 901 perform the corresponding functions described herein. In another example, the functionality of any of such components can be partitioned between processing circuitry 901 and communication subsystem 931. In another example, the non-computationally intensive functions of any of such components can be implemented in software or firmware and the computationally intensive functions can be implemented in hardware.

Figure 10:
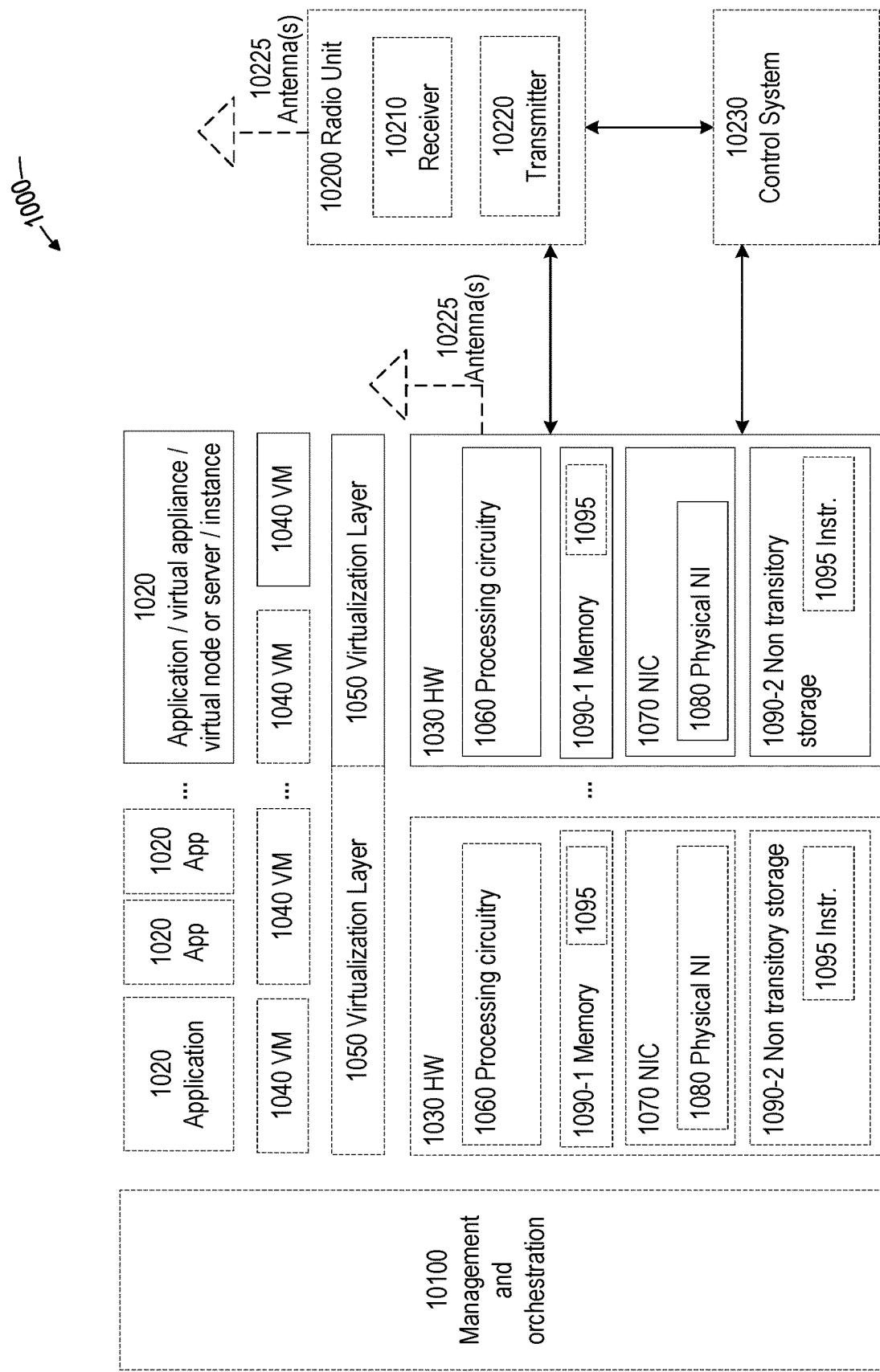
FIG. 10 is a block diagram illustrating an exemplary virtualization environment usable for implementation of various embodiments of network nodes described herein.

FIG. 10 is a schematic block diagram illustrating a virtualization environment 1000 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station, a virtualized radio access node, a virtualized NCAF, a virtualized NF that performs the functions and/or operations of a NCAF, a virtualized application service, or a virtualized backend controller) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node, NF, application service or backend controller), then the network node can be entirely virtualized.

The functions can be implemented by one or more applications 1020 (which can alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which can be commercial off-the-shelf (COTS) processors, dedicated Application Specific Integrated Circuits (ASICs), or any other type of processing circuitry including digital or analog hardware components or special purpose processors. Each hardware device can comprise memory 1090-1 which can be non-persistent memory for temporarily storing instructions 1095 or software executed by processing circuitry 1060. Each hardware device can comprise one or more network interface controllers (NICs) 1070, also known as network interface cards, which include physical network interface 1080. Each hardware device can also include non-transitory, persistent, machine-readable storage media 1090-2 having stored therein software 1095 and/or instructions executable by processing circuitry 1060. Software 1095 can include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and can be run by a corresponding virtualization layer 1050 or hypervisor. Different embodiments of the instance of virtual appliance 1020 can be implemented on one or more of virtual machines 1040, and the implementations can be made in different ways.

During operation, processing circuitry 1060 executes software 1095 to instantiate the hypervisor or virtualization layer 1050, which can sometimes be referred to as a virtual machine monitor (VMM). Virtualization layer 1050 can present a virtual operating platform that appears like networking hardware to virtual machine 1040.

As shown in FIG. 10, hardware 1030 can be a standalone network node with generic or specific components. Hardware 1030 can comprise antenna 10225 and can implement some functions via virtualization. Alternatively, hardware 1030 can be part of a larger cluster of hardware (e.g., such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1040 can be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 can be coupled to one or more antennas 10225. Radio units 10200 can communicate directly with hardware nodes 1030 via one or more appropriate network interfaces and can be used in combination with the virtual components to provide a virtual node with radio capabilities, such as a radio access node or a base station.

In some embodiments, some signalling can be effected with the use of control system 10230 which can alternatively be used for communication between the hardware nodes 1030 and radio units 10200.

Figure 11:
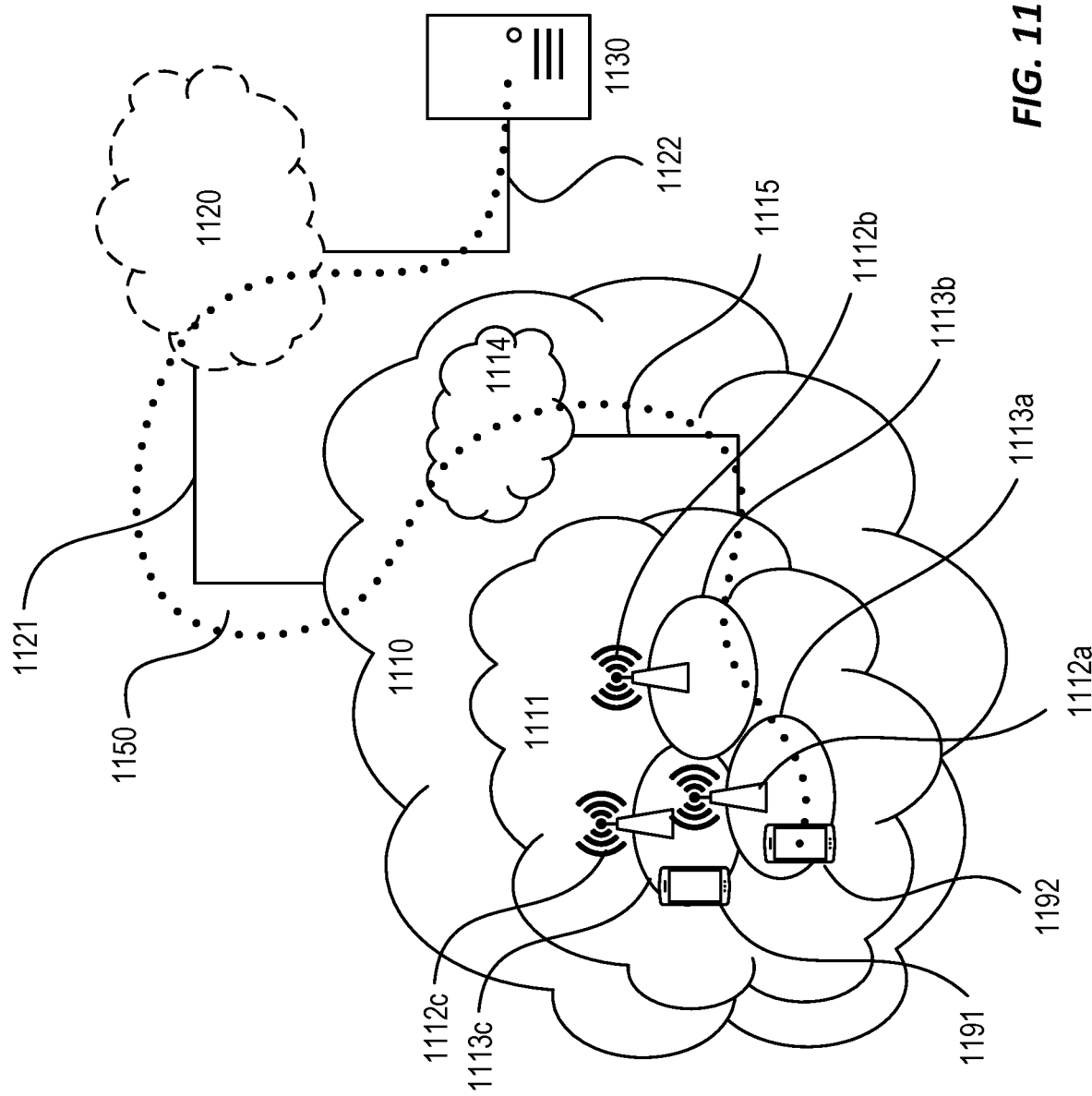
FIGS. 11-12 are block diagrams of various exemplary communication systems and/or networks, in accordance with various aspects described herein.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c can be configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the Telecommunication network 1110 is itself connected to host computer 1130, which can be embodied in the hardware and/or software of a standalone server, a cloud-implemented server, a distributed server or as processing resources in a server farm. Host computer 1130 can be under the ownership or control of a service provider, or can be operated by the service provider or on behalf of the service provider. The service provider can be the provider of the application service described herein, and therefore the host computer 1130 can be, or implement, the application service and/or the backend controller. Connections 1121 and 1122 between telecommunication network 1110 and host computer 1130 can extend directly from core network 1114 to host computer 1130 or can go via an optional intermediate network 1120. Intermediate network 1120 can be one of, or a combination of more than one of, a public, private or hosted network; intermediate network 1120, if any, can be a backbone network or the Internet; in particular, intermediate network 1120 can comprise two or more sub-networks (not shown).

The communication system of FIG. 11 as a whole enables connectivity between the connected UEs 1191, 1192 and host computer 1130, for example for the data transfer that is negotiated according to the techniques described herein. The connectivity can be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 can be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210, which as noted above can be, or implement, the application service and/or the backend controller, comprises hardware 1215 including communication interface 1216 configured to set up and maintain a wired or wireless connection with an interface of a different communication device of communication system 1200. Host computer 1210 further comprises processing circuitry 1218, which can have storage and/or processing capabilities. In particular, processing circuitry 1218 can comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 can be operable to provide a service to a remote user, such as UE 1230 connecting via OTT connection 1250 terminating at UE 1230 and host computer 1210. In providing the service to the remote user, host application 1212 can provide user data which is transmitted using OTT connection 1250, and which is negotiated according to the techniques described herein.

Communication system 1200 can also include base station 1220 provided in a telecommunication system and comprising hardware 1225 enabling it to communicate with host computer 1210 and with UE 1230. Hardware 1225 can include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 can be configured to facilitate connection 1260 to host computer 1210. Connection 1260 can be direct or it can pass through a core network (not shown in FIG. 12) of the telecommunication system and/or through one or more intermediate networks outside the telecommunication system. In the embodiment shown, hardware 1225 of base station 1220 can also include processing circuitry 1228, which can comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 can also include UE 1230 already referred to. Its hardware 1235 can include radio interface 1237 configured to set up and maintain wireless connection 1270 with a base station serving a coverage area in which UE 1230 is currently located. Hardware 1235 of UE 1230 can also include processing circuitry 1238, which can comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 can be operable to provide a service to a human or non-human user via UE 1230, with the support of host computer 1210. In host computer 1210, an executing host application 1212 can communicate with the executing client application 1232 via OTT connection 1250 terminating at UE 1230 and host computer 1210. In providing the service to the user, client application 1232 can receive request data from host application 1212 and provide user data in response to the request data. OTT connection 1250 can transfer both the request data and the user data. Client application 1232 can interact with the user to generate the user data that it provides.

Figure 12:
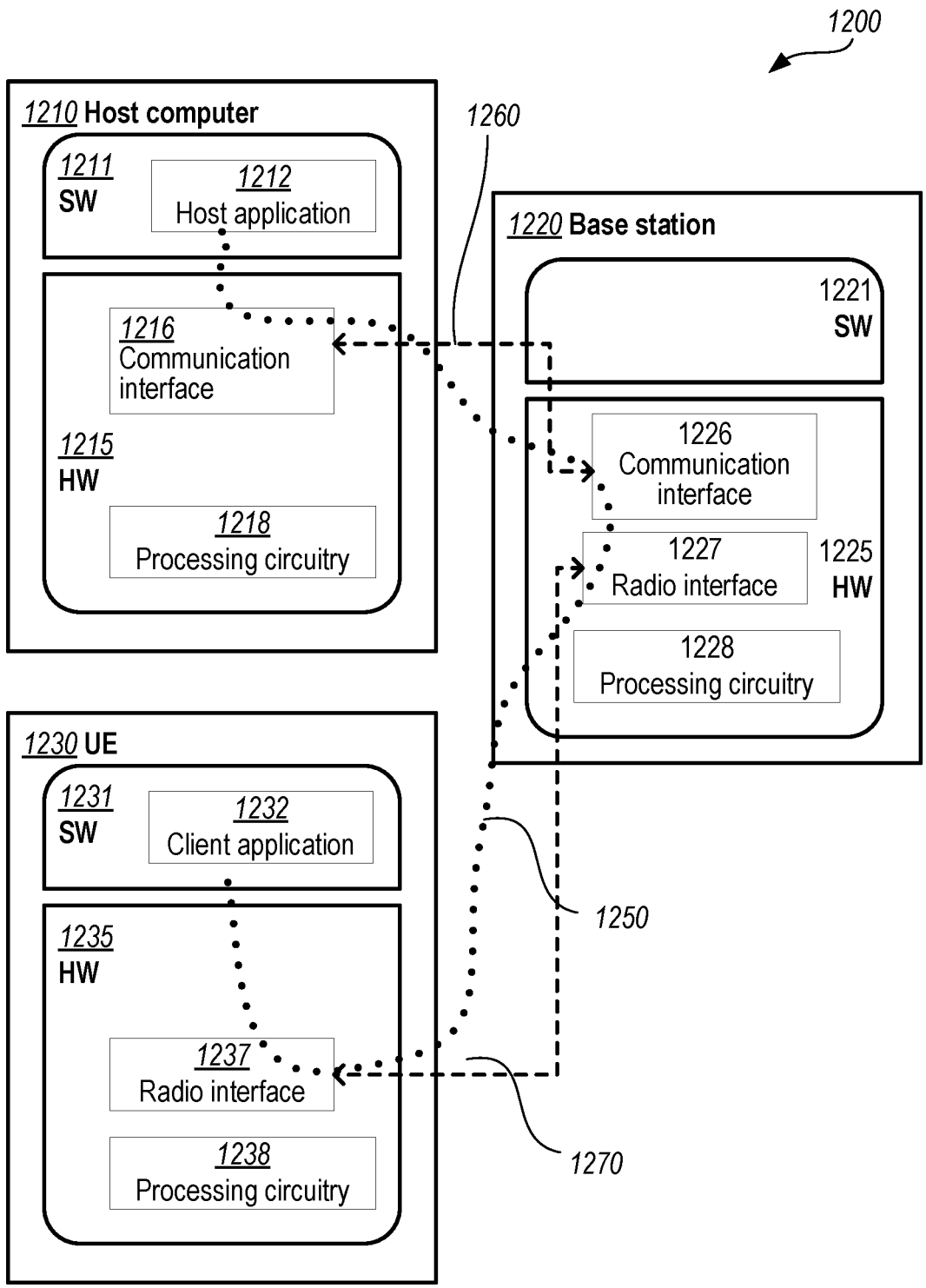

It is noted that host computer 1210, base station 1220 and UE 1230 illustrated in FIG. 12 can be similar or identical to host computer 1130, one of base stations 1112a, 1112b, 1112c and one of UEs 1191, 1192 of FIG. 11, respectively. This is to say, the inner workings of these entities can be as shown in FIG. 12 and independently, the surrounding network topology can be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure can determine the routing, which it can be configured to hide from UE 1230 or from the service provider operating host computer 1210, or both. While OTT connection 1250 is active, the network infrastructure can further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1250 between host computer 1210 and UE 1230, in response to variations in the measurement results. The measurement procedure and/or the network functionality for reconfiguring OTT connection 1250 can be implemented in software 1211 and hardware 1215 of host computer 1210 or in software 1231 and hardware 1235 of UE 1230, or both. In embodiments, sensors (not shown) can be deployed in or in association with communication devices through which OTT connection 1250 passes; the sensors can participate in the measurement procedure by supplying values of the monitored quantities exemplified above, or supplying values of other physical quantities from which software 1211, 1231 can compute or estimate the monitored quantities. The reconfiguring of OTT connection 1250 can include message format, retransmission settings, preferred routing etc.; the reconfiguring need not affect base station 1220, and it can be unknown or imperceptible to base station 1220. Such procedures and functionalities can be known and practiced in the art. In certain embodiments, measurements can involve proprietary UE signaling facilitating host computer 1210's measurements of throughput, propagation times, latency and the like. The measurements can be implemented in that software 1211 and 1231 causes messages to be transmitted, in particular empty or 'dummy' messages, using OTT connection 1250 while it monitors propagation times, errors etc.

Figure 13:
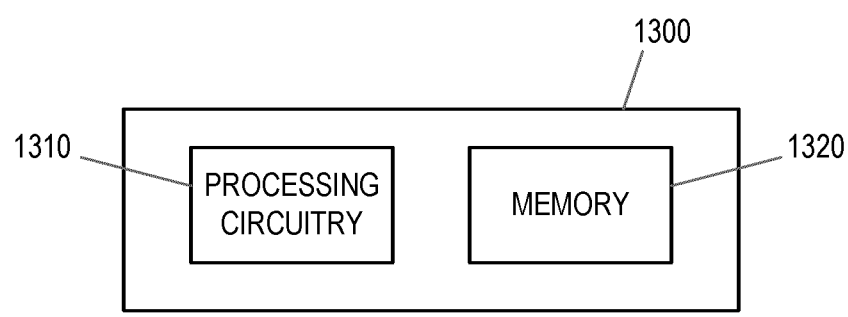
FIG. 13 is a block diagram of embodiments of an apparatus according to various exemplary embodiments of the present disclosure.

FIG. 13 a block diagram of embodiments of an apparatus according to various exemplary embodiments of the present disclosure. The apparatus 1300 can take the form of, or be part of, a NCAF as described herein, a NF or core network node that implements the functions and/or operations of a NCAF, a backend controller associated with an application service, or an application service. Apparatus 1300 is operable or can be arranged or configured to carry out some or all parts of the exemplary methods and processes described herein, for example any of the exemplary methods in FIGS. 6 and 7.

Apparatus 1300, which may be a virtual apparatus, may comprise processing circuitry 1310, which may include one or more microprocessor or microcontrollers, as well as other digital hardware, which may include digital signal processors (DSPs), special-purpose digital logic, and the like. The processing circuitry 1310 may be implemented in a similar way to any of the processing circuitry 820, 870 in FIG. 8, or the processing circuitry 1060 in FIG. 10. The processing circuitry 1310 may be configured to execute program code stored in memory 1320, which may include one or several types of memory such as read-only memory (ROM), random-access memory, cache memory, flash memory devices, optical storage devices, etc. Program code stored in memory 1320 can include program instructions for carrying out one or more of the techniques described herein, for example any of the exemplary methods in FIGS. 6 and 7. Although not shown in FIG. 13, the apparatus 1300 may also include one or more network interface controllers (NICs), for example as described above with reference to FIG. 10.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, a Narrowband IoT (NB-IOT) device, a V2X UE, etc.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The invention claimed is:

1. A method, performed by a network node in a communication network, for negotiating a data transfer between an application service and a user equipment (UE) via the communication network, the method comprising:
   receiving, from the application service or a backend controller associated with the application service, a request for network capacity available for data transfer, wherein the request includes an indication of an amount of data to be transferred, one or more trajectories of the UE and one or more quality-of-service (QoS) profiles for the data transfer;
   determining network capacity along the one or more trajectories for each of the one or more QoS profiles based on load information associated with a radio access network (RAN) of the communication network; and
   sending, to the application service or the backend controller associated with the application service, a response including information related to the determined network capacity along the one or more trajectories for each of the one or more QoS profiles.

2. The method of claim 1, wherein each trajectory comprises a plurality of time-position tuples, each tuple comprising a particular time and a particular position at which the UE is expected to be located at the particular time.

3. The method of claim 1, wherein determining the network capacity along the one or more trajectories comprises:
   receiving, from a coverage map database, network coverage information for the plurality of positions comprising each of the trajectories;
   for each of the trajectories, determining network resources needed to execute the data transfer based on the network coverage information; and
   for each of the trajectories, determining network capacity based on the load information related to the determined network resources.

4. The method of claim 1, wherein the request further comprises one or more of the following:
   a desired type of units and/or statistics for expressing network capacity; and
   a desired response configuration, which indicates one of the following:
      one-time response;
      periodic response according to a periodicity and a maximum number of responses; or
      update of a previously delivered response according to a trigger condition.

5. The method of claim 1, wherein:
   the information related to the network capacity comprises a vector of capacity values; and
   each capacity value corresponds to a particular time interval during which the particular capacity value is valid.

6. The method of claim 1, further comprising:
   determining updated network capacity along the one or more trajectories based on updated load information associated the RAN;
   determining that a difference between the updated network capacity and the network capacity, along at least one of the trajectories, is greater than a predetermined threshold; and
   in response to this difference determination, sending, to the application service or the backend controller associated with the application service, information related to the updated network capacity.

7. A method for negotiating a data transfer between an application service and a user equipment (UE) via a communication network, the method performed by the application service or a backend controller associated with the application service and comprising:
   sending, to the communication network, a request for network capacity available for data transfer, wherein the request includes an indication of an amount of data to be transferred, one or more trajectories of the UE and one or more quality of service (QoS) profiles for the data transfer;
   receiving, from the communication network, a response including information related to network capacity along the one or more trajectories for each of the one or more QoS profiles according to load information associated with a radio access network (RAN) of the communication network;

determining a delivery plan for the data transfer based on the information related to network capacity, wherein determining a delivery plan comprises selecting a particular one of the QoS profiles and a particular one of the trajectories; and configuring at least one of the UE and a content server to execute the data transfer according to the determined delivery plan.

8. The method of claim 7, further comprising receiving a planned route from the UE, wherein the one or more trajectories are based on the planned route.

9. The method of claim 7, wherein each trajectory comprises a plurality of time-position tuples, each tuple comprising a particular time and a particular position at which the UE is expected to be located at the particular time.

10. The method of claim 7, wherein the request further comprises one or more of the following:
a desired type of units and/or statistics for expressing network capacity; and
a desired response configuration, which indicates one of the following:
one-time response;
periodic response according to a periodicity and a maximum number of responses; or
update of a previously delivered response according to a trigger condition.

11. The method of claim 7, wherein one of the following applies:
selecting the particular QoS profile is based on one or more of the following: a time deadline of the data transfer and a spatial deadline of the data transfer; or
the selected QoS profile is the particular QoS profile having the largest network capacity along the selected trajectory.

12. The method of claim 7, further comprising establishing or modifying at least one of the following based on the selected QoS profile:
a QoS flow between the UE and the communication network; and
a protocol data unit, PDU, session between the UE and the communication network.

13. The method of claim 7, wherein:
the information related to the network capacity comprises a vector of capacity values; and
each capacity value corresponds to a particular time interval during which the particular capacity value is valid.

14. The method of claim 13, wherein determining a delivery plan comprises selecting, based on the vector of capacity values and the corresponding time intervals, one or more time windows during which the data transfer will be executed.

15. The method of claim 14, wherein one of the following applies:
the one or more time windows comprises a contiguous plurality of the time intervals during which the corresponding capacity values are greater than a threshold; or
the one or more time windows comprises a non-contiguous plurality of the time intervals and the delivery plan further indicates that the data transfer will be paused or stopped during the intervening time intervals between the non-contiguous plurality.

16. The method of claim 14, wherein determining a delivery plan comprises determining a speed for the UE during at least a portion of the selected time window.

17. The method of claim 7, wherein configuring at least one of the UE and the content server to execute the data transfer comprises sending a plurality of application commands, to the UE or the content server, for controlling execution of the data transfer along the trajectory of the UE.

18. The method of claim 17, wherein the plurality of commands include:
starting or resuming the data transfer during time windows included in the delivery plan, and
stopping or pausing the data transfer during time windows not included in the delivery plan.

19. A network node configured to negotiate a data transfer between an application service and a user equipment (UE) via a communication network, the network node comprising:
a network interface controller configured to communicate with the application service; and
processing circuitry operably coupled to the network interface controller, whereby the network interface controller and processing circuitry are configured to:
receive, from the application service or a backend controller associated with the application service, a request for network capacity available for data transfer, wherein the request includes an indication of an amount of data to be transferred, one or more trajectories of the UE and one or more quality-of-service (QoS) profiles for the data transfer;
determine network capacity along the one or more trajectories for each of the one or more QoS profiles based on load information associated with a radio access network (RAN) of the communication network; and
send, to the application service or the backend controller associated with the application service, a response including information related to the determined network capacity along the one or more trajectories for each of the one or more QoS profiles.

20. The network node of claim 19, wherein each trajectory comprises a plurality of time-position tuples, each tuple comprising a particular time and a particular position at which the UE is expected to be located at the particular time.

21. The network node of claim 19, wherein the network interface controller and processing circuitry are configured to determine the network capacity along the one or more trajectories by:
receiving, from a coverage map database, network coverage information for the plurality of positions comprising each of the trajectories;
for each of the trajectories, determining network resources needed to execute the data transfer based on the network coverage information; and
for each of the trajectories, determining network capacity based on the load information related to the determined network resources.

22. The network node of claim 19, wherein the request further comprises one or more of the following:
a desired type of units and/or statistics for expressing network capacity; and
a desired response configuration, which indicates one of the following:
one-time response;
periodic response according to a periodicity and a maximum number of responses; or update of a previously delivered response according to a trigger condition.

23. The network node of claim 19, wherein:
the information related to the network capacity comprises a vector of capacity values; and
each capacity value corresponds to a particular time interval during which the particular capacity value is valid.

24. The network node of claim 19, wherein the network interface controller and processing circuitry are further configured to:
determine updated network capacity along the one or more trajectories based on updated load information associated the RAN;
determine that a difference between the updated network capacity and the network capacity, along at least one of the trajectories, is greater than a predetermined threshold; and
in response to this difference determination, send, to the application service or the backend controller associated with the application service, information related to the updated network capacity.

25. An apparatus configured to negotiate a data transfer between an application service and a user equipment (UE) via a communication network, the apparatus comprising:
a network interface controller configured to communicate with a network node associated with the communication network; and
processing circuitry operably coupled to the network interface controller, whereby the network interface controller and the processing circuitry are configured to:
send, to the communication network, a request for network capacity available for data transfer, wherein the request includes an indication of an amount of data to be transferred, one or more trajectories of the UE and one or more quality of service (QoS) profiles for the data transfer;
receive, from the communication network, a response including information related to network capacity along the one or more trajectories for each of the one or more QoS profiles according to load information associated with a radio access network (RAN) of the communication network;
determine a delivery plan for the data transfer based on the information related to network capacity by selecting a particular one of the QoS profiles and a particular one of the trajectories; and
configure at least one of the UE and a content server to execute the data transfer according to the determined delivery plan.

26. The apparatus of claim 25, wherein the network interface controller and processing circuitry are further configured to receive a planned route from the UE, wherein the one or more trajectories are based on the planned route.

27. The apparatus of claim 25, wherein each trajectory comprises a plurality of time-position tuples, each tuple comprising a particular time and a particular position at which the UE is expected to be located at the particular time.

28. The apparatus of claim 25, wherein the request further comprises one or more of the following:
a desired type of units and/or statistics for expressing network capacity; and
a desired response configuration, which indicates one of the following:
one-time response;
periodic response according to a periodicity and a maximum number of responses; or
update of a previously delivered response according to a trigger condition.

29. The apparatus of claim 25, wherein one of the following applies:
the network interface controller and processing circuitry are configured to select the particular QoS profile based on one or more of the following: a time deadline of the data transfer and a spatial deadline of the data transfer; or
the selected QoS profile is the particular QoS profile having the largest network capacity along the selected trajectory.

30. The apparatus of claim 25, wherein the network interface controller and processing circuitry are further configured to establish or modify at least one of the following based on the selected QoS profile:
a QoS flow between the UE and the communication network; and
a protocol data unit, PDU, session between the UE and the communication network.

31. The apparatus of claim 25, wherein:
the information related to the network capacity comprises a vector of capacity values; and
each capacity value corresponds to a particular time interval during which the particular capacity value is valid.

32. The apparatus of claim 31, wherein the network interface controller and processing circuitry are configured to determine a delivery plan by selecting, based on the vector of capacity values and the corresponding time intervals, one or more time windows during which the data transfer will be executed.

33. The apparatus of claim 32, wherein one of the following applies:
the one or more time windows comprises a contiguous plurality of the time intervals during which the corresponding capacity values are greater than a threshold; or
the one or more time windows comprises a non-contiguous plurality of the time intervals and the delivery plan further indicates that the data transfer will be paused or stopped during the intervening time intervals between the non-contiguous plurality.

34. The apparatus of claim 32, wherein the network interface controller and processing circuitry are configured to determine a delivery plan by determining a speed for the UE during at least a portion of the selected time window.

35. The apparatus of claim 25, wherein the network interface controller and processing circuitry are configured to configure at least one of the UE and the content server to execute the data transfer by sending a plurality of application commands, to the UE or the content server, for controlling execution of the data transfer along the trajectory of the UE.

36. The apparatus of claim 35, wherein the plurality of commands include:
starting or resuming the data transfer during time windows included in the delivery plan, and
stopping or pausing the data transfer during time windows not included in the delivery plan.

* * * * *

UNITED STATES PATENT AND TRADEMARK OFFICE
CERTIFICATE OF CORRECTION

PATENT NO. : 12,035,173 B2  
APPLICATION NO. : 17/435134  
DATED : July 9, 2024  
INVENTOR(S) : Cellarius et al.

Page 1 of 3

It is certified that error appears in the above-identified patent and that said Letters Patent is hereby corrected as shown below:

On the Title Page

Item (57), under "ABSTRACT", in Column 1, Line 6, delete "related" and insert -- related to --, therefor.

In the Drawings

In Fig. 6, Sheet 5 of 12, for Tag "640", in Line 1, delete "related" and insert -- related to --, therefor.

In Fig. 6, Sheet 5 of 12, for Tag "650", in Line 2, delete "associated" and insert -- associated with --, therefor.

In Fig. 7, Sheet 6 of 12, for Tag "746", in Line 2, delete "window" and insert -- window. --, therefor.

In the Specification

In Column 1, Line 58, delete "third-" and insert -- third-generation --, therefor.

In Column 2, Line 44, delete "respect" and insert -- respect to --, therefor.

In Column 2, Line 58, delete "NDS/TP" and insert -- NDS/IP --, therefor.

In Column 2, Line 60, delete "include" and insert -- includes --, therefor.

In Column 2, Line 65, delete "such" and insert -- such as --, therefor.

In Column 5, Line 24, delete "depending" and insert -- depending on --, therefor.

In Column 5, Line 40, delete "as" and insert -- as those --, therefor.

Signed and Sealed this  
Eighteenth Day of February, 2025

Coke Morgan Stewart  
*Acting Director of the United States Patent and Trademark Office*

CERTIFICATE OF CORRECTION (continued)
U.S. Pat. No. 12,035,173 B2

In Column 6, Line 35, delete "related" and insert -- related to --, therefor.

In Column 7, Line 17, delete "related" and insert -- related to --, therefor.

In Column 8, Line 2, delete "related" and insert -- related to --, therefor.

In Column 8, Line 52, delete "related" and insert -- related to --, therefor.

In Column 9, Line 2, delete "related" and insert -- related to --, therefor.

In Column 9, Line 11, delete "(for" and insert -- for --, therefor.

In Column 10, Line 46, delete "as" and insert -- as those --, therefor.

In Column 11, Line 20, delete "aware" and insert -- aware of --, therefor.

In Column 17, Line 18, delete "the a" and insert -- the --, therefor.

In Column 18, Line 38, delete "related" and insert -- related to --, therefor.

In Column 18, Line 51, delete "associated" and insert -- associated with --, therefor.

In Column 19, Line 51, delete "related" and insert -- related to --, therefor.

In Column 23, Line 30, delete "units" and insert -- units. --, therefor.

In Column 24, Lines 43-44, delete "radio front end circuitry 890" and insert -- radio front end circuitry 892 --, therefor.

In Column 25, Line 60, delete "(CPE)." and insert -- (CPE), --, therefor.

In Column 26, Line 12, delete "etc.) personal" and insert -- etc.), personal --, therefor.

In Column 26, Lines 47-48, delete "Radio front end circuitry 814" and insert -- Radio front end circuitry 812 --, therefor.

In Column 29, Line 35, delete "interchangeable." and insert -- interchangeably. --, therefor.

In Column 31, Line 13, delete "micro-DIMIM" and insert -- micro-DIMM --, therefor.

In Column 32, Line 51, delete "memory 1090. Memory 1090" and insert -- memory 1090-1. Memory 1090-1 --, therefor.

In Column 34, Line 19, delete "the" and insert -- the base station. --, therefor.

CERTIFICATE OF CORRECTION (continued)
U.S. Pat. No. 12,035,173 B2

In Column 37, Line 3, delete "a" and insert -- is a --, therefor.

In Column 37, Line 62, delete "(RRU) Remote" and insert -- (RRU), Remote --, therefor.

In Column 37, Line 63, delete "mobile" and insert -- mobility --, therefor.

In Column 38, Line 44, delete "equipped" and insert -- equipment --, therefor.

In the Claims

In Column 40, Line 45, in Claim 6, delete "associated" and insert -- associated with --, therefor.

In Column 43, Line 14, in Claim 24, delete "associated" and insert -- associated with --, therefor.